US007482916B2

(12) United States Patent
Au et al.

(10) Patent No.: US 7,482,916 B2
(45) Date of Patent: Jan. 27, 2009

(54) AUTOMATIC SIGNALING SYSTEMS FOR VEHICLES

(76) Inventors: Anita Au, 14021 Seagate Dr., San Leandro, CA (US) 94577; Gerald Chan, 14021 Seagate Dr., San Leandro, CA (US) 94577

( * ) Notice: Subject to any disclaimer, the term of this patent is extended or adjusted under 35 U.S.C. 154(b) by 0 days.

(21) Appl. No.: 11/046,047

(22) Filed: Jan. 28, 2005

(65) Prior Publication Data

US 2005/0200467 A1 Sep. 15, 2005

Related U.S. Application Data

(60) Provisional application No. 60/553,426, filed on Mar. 15, 2004.

(51) Int. Cl.
*B60Q 1/34* (2006.01)
(52) U.S. Cl. .................. 340/475; 340/476; 340/477
(58) Field of Classification Search .......... 340/465, 340/475, 476, 477
See application file for complete search history.

(56) References Cited

U.S. PATENT DOCUMENTS

| 4,030,066 A | 6/1977 | White |
| 4,333,071 A | 6/1982 | Kira et al. |
| 4,403,211 A | 9/1983 | Shibata et al. |
| 4,638,290 A | 1/1987 | Wagner |
| 4,660,020 A | 4/1987 | Miyamaru et al. |
| 4,772,868 A | 9/1988 | Chen |
| 4,792,785 A | 12/1988 | Yukio et al. |
| 4,962,366 A | 10/1990 | Hatanaka et al. |
| 4,970,653 A | 11/1990 | Kenue |
| 5,239,148 A | 8/1993 | Reed |
| 5,245,422 A | 9/1993 | Borcherts et al. |
| 5,351,044 A | 9/1994 | Mathur et al. |
| 5,360,953 A | 11/1994 | Reed |
| 5,428,512 A | 6/1995 | Mouzas |
| 5,642,093 A | 6/1997 | Kinoshita et al. |
| 5,673,019 A | 9/1997 | Dantoni |
| 5,712,618 A * | 1/1998 | McKenna ................. 340/475 |
| 5,757,949 A | 5/1998 | Kinoshita et al. |
| 5,765,116 A | 6/1998 | Wilson-Jones et al. |
| 5,790,403 A | 8/1998 | Nakayama |
| 5,835,028 A | 11/1998 | Bender et al. |
| 5,892,855 A | 4/1999 | Kakinami et al. |
| 5,913,376 A | 6/1999 | Takei |
| 5,922,036 A | 7/1999 | Yasui et al. |
| 5,982,278 A | 11/1999 | Cuvelier |
| 5,991,427 A | 11/1999 | Kakinami et al. |

(Continued)

FOREIGN PATENT DOCUMENTS

JP 09039650 2/1997

(Continued)

*Primary Examiner*—Daryl C Pope
(74) *Attorney, Agent, or Firm*—Gerald Chan

(57) ABSTRACT

An automatic signaling system includes a processor having an input for receiving a signal from a sensor, and an output configured to be coupled to a signaling system of a vehicle, the signaling system having a turn signal light, wherein the processor is configured to automatically activate the turn signal light based at least in part on the signal received from the sensor. A method for activating a turn signal light of a vehicle includes receiving a signal from a sensor, and automatically activating the turn signal light of the vehicle based at least in part on the received signal.

48 Claims, 7 Drawing Sheets

U.S. PATENT DOCUMENTS

| | | | |
|---|---|---|---|
| 6,005,492 | A | 12/1999 | Tamura et al. |
| 6,019,184 | A | 2/2000 | Nagai |
| 6,025,775 | A * | 2/2000 | Erlandson .................. 340/436 |
| 6,057,754 | A | 5/2000 | Kinoshita et al. |
| 6,107,939 | A | 8/2000 | Sorden |
| 6,170,955 | B1 | 1/2001 | Campbell et al. |
| 6,184,821 | B1 | 2/2001 | Hrovat et al. |
| 6,204,759 | B1 | 3/2001 | Jahnke |
| 6,215,392 | B1 | 4/2001 | Okada |
| 6,314,354 | B1 | 11/2001 | Shimizu et al. |
| 6,317,202 | B1 | 11/2001 | Hosokawa et al. |
| 6,320,176 | B1 | 11/2001 | Shofield et al. |
| 6,345,228 | B1 | 2/2002 | Lees |
| 6,356,189 | B1 | 3/2002 | Fujimaki |
| 6,370,474 | B1 | 4/2002 | Hiwatashi et al. |
| 6,370,475 | B1 | 4/2002 | Breed et al. |
| 6,388,565 | B1 | 5/2002 | Bernhard et al. |
| 6,411,901 | B1 | 6/2002 | Hiwatashi et al. |
| 6,433,816 | B1 | 8/2002 | Lee |
| 6,445,288 | B1 | 9/2002 | Pittman |
| 6,489,887 | B2 | 12/2002 | Satoh et al. |
| 6,498,570 | B2 | 12/2002 | Ross |
| 6,502,035 | B2 * | 12/2002 | Levine ....................... 701/301 |
| 6,546,118 | B1 | 4/2003 | Iisaka et al. |
| 6,556,909 | B2 | 4/2003 | Matsumoto et al. |
| 6,560,535 | B2 | 5/2003 | Levy et al. |
| 6,577,246 | B1 | 6/2003 | Handa et al. |
| 6,580,987 | B2 | 6/2003 | Sadano et al. |
| 6,591,000 | B1 | 7/2003 | Oike et al. |
| 6,606,027 | B1 | 8/2003 | Reeves et al. |
| 6,665,603 | B2 | 12/2003 | Jindo et al. |
| 6,684,149 | B2 | 1/2004 | Nakamura et al. |
| 6,693,583 | B2 | 2/2004 | Tamatsu et al. |
| 6,708,098 | B2 | 3/2004 | Matsumoto et al. |
| 6,732,021 | B2 | 5/2004 | Matsumoto et al. |
| 6,741,186 | B2 | 5/2004 | Ross |
| 6,744,380 | B2 | 6/2004 | Imanishi et al. |
| 6,748,302 | B2 | 6/2004 | Kawazoe |
| 6,753,766 | B2 | 6/2004 | Patchell |
| 6,768,933 | B2 | 7/2004 | Serezat |
| 6,778,890 | B2 | 8/2004 | Shimakage et al. |
| 6,792,345 | B2 | 9/2004 | Matsumoto et al. |
| 6,813,370 | B1 | 11/2004 | Arai et al. |
| 6,819,235 | B2 | 11/2004 | Hasebe |
| 6,819,779 | B1 | 11/2004 | Nichani |
| 6,823,241 | B2 | 11/2004 | Shirato et al. |
| 6,842,189 | B2 | 1/2005 | Park |
| 6,842,687 | B2 | 1/2005 | Winner et al. |
| 6,850,628 | B2 | 2/2005 | Shirato |
| 6,850,629 | B2 | 2/2005 | Jeon |
| 6,868,168 | B2 | 3/2005 | Tsuji |
| 6,876,300 | B2 * | 4/2005 | Ponziani ..................... 340/476 |
| 6,879,706 | B2 | 4/2005 | Satoh et al. |
| 6,879,890 | B2 | 4/2005 | Matsumoto et al. |
| 6,889,161 | B2 | 5/2005 | Winner et al. |
| 6,927,694 | B1 | 8/2005 | Smith et al. |
| 6,930,593 | B2 | 8/2005 | Crawshaw |
| 6,972,675 | B2 | 12/2005 | Mills et al. |
| 6,973,380 | B2 | 12/2005 | Tange et al. |
| 6,975,218 | B2 * | 12/2005 | Madau ....................... 340/476 |
| 6,993,425 | B2 | 1/2006 | Tange et al. |
| 7,002,458 | B2 | 2/2006 | Su |
| 7,016,517 | B2 | 3/2006 | Furusho |
| 7,085,633 | B2 | 8/2006 | Nishira et al. |
| 7,091,838 | B2 | 8/2006 | Shimakage |
| 7,113,866 | B2 * | 9/2006 | Taliwal ....................... 701/208 |
| 7,164,132 | B2 | 1/2007 | Didomenico et al. |
| 2002/0019703 | A1 | 2/2002 | Levine |
| 2002/0095246 | A1 | 7/2002 | Kawazoe |
| 2002/0175813 | A1 | 11/2002 | Ross |
| 2003/0004643 | A1 | 1/2003 | Serezat |
| 2003/0120414 | A1 | 6/2003 | Matsumoto et al. |
| 2003/0123705 | A1 | 7/2003 | Stam et al. |
| 2003/0151502 | A1 | 8/2003 | Kam |
| 2003/0156015 | A1 | 8/2003 | Winner et al. |
| 2003/0229447 | A1 | 12/2003 | Wheatley et al. |
| 2004/0155767 | A1 | 8/2004 | Hankins |

FOREIGN PATENT DOCUMENTS

| | | |
|---|---|---|
| JP | 11342808 | 12/1999 |

* cited by examiner

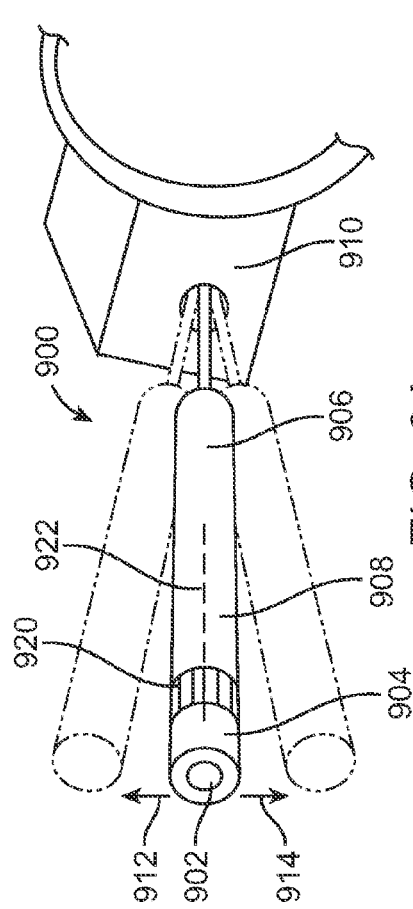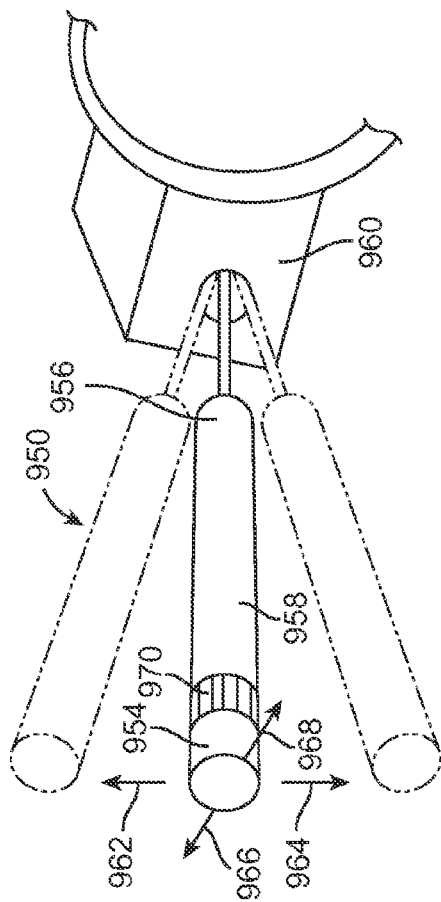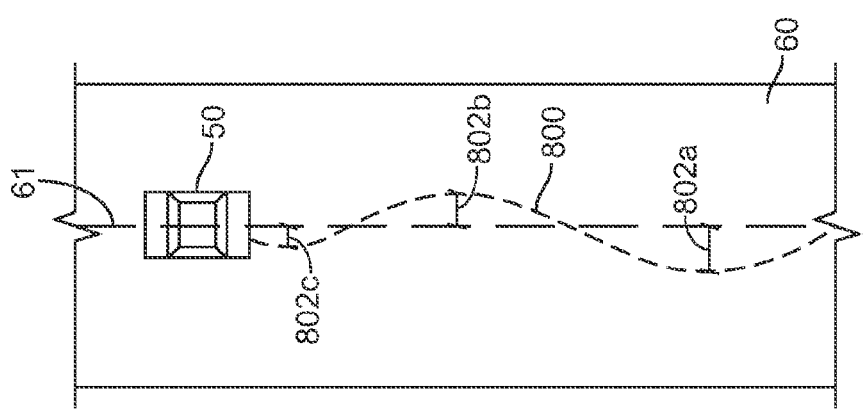

AUTOMATIC SIGNALING SYSTEMS FOR VEHICLES

RELATED APPLICATION DATA

This application claims the benefit of U.S. Provisional Patent Application No. 60/553,426, filed on Mar. 15, 2004, the entire disclosure of which is expressly incorporated by reference herein.

BACKGROUND

1. Field of the Invention

The field of the invention pertains to systems and methods for operating a vehicle, and more particularly, to systems and methods for activating and/or deactivating a turn signaling system of a vehicle.

2. Background

The exterior turn signal lights of a vehicle serve many important functions during operation of the vehicle. For examples, activation of the exterior turn signal light informs pedestrian and/or drivers that the driver of the subject vehicle is about to make a turn or wish to make a lane change. In addition, activation of the exterior turn signal light warns other drivers that one is making a lane change. This is particularly important when operating a vehicle in a highway or freeway. Drivers of vehicles occasionally make lane change and turn at intersections, but many of these drivers fail to use the exterior turn signal lights to inform other drivers of the lane change and turn maneuvers. As the result, this increases the risk of having an accident. Each year, approximately 50,000 people die and approximately three million people are injured as the result of traffic accidents. Traffic accidents cost insurance companies and automobile manufacturers over a hundred million dollars each year.

Numerous accident avoidance systems and safety features have been proposed that are intended to prevent or reduce a risk of an accident by warning a driver and/or controlling the vehicle upon recognizing an imminent hazard. For example, U.S. Pat. No. 6,321,159B1 describes a driving lane tracking system that maintains a moving vehicle within a lane. U.S. Pat. No. 6,226,389 B1 describes a motor vehicle warning and control system that uses fuzzy logic to determine a hazardous condition and warns the driver or operates the vehicle when a hazardous condition is detected. Many of these systems are difficult and costly to implement. In addition, the effectiveness of many of these systems depends on the accuracy and reliability of the system in detecting the hazardous condition. An accurate and reliable hazard recognition system is difficult to implement because it is almost impossible to account for all possible road hazards. Hazard recognition systems are also expensive to test. Furthermore, because the dependability of many of the proposed systems that use hazard recognition systems is yet to be determined, drivers of vehicles that use these systems may not feel completely confident or may have difficulty accepting the technologies associated with the systems. Until any of these systems is proven safe and reliable, the preferable accident avoidance system is still the one that relies on drivers' awareness and judgment.

The use of exterior turn signal lights while making lane change has the benefit of improving the awareness of other drivers, and hence, allowing the drivers to make better judgment, such as to brake or to change a direction of motion, in order to avoid an accident. Unfortunately, as mentioned previously, many drivers nowadays are becoming more lazy and reluctant to use the exterior turn signal lights, especially during a lane change situation. Also, some drivers find it inconvenient and/or hazardous to take their hands off the steering wheel to position the lever of the turn signal lights. As such, it would be desirable to have an automatic signaling system that can automatically activate the exterior turn signal lights of a vehicle in order to assist drivers in making lane change or turning maneuvers, and/or to provide warnings to pedestrians and to drivers of other vehicles.

U.S. Pat. No. 5,712,618 describes an automatic signaling device that activates turn signal lights of a vehicle based on a determination of an angle of rotation of a steering wheel, lateral speed and lateral acceleration of the vehicle. U.S. Pat. No. 3,771,096 discloses a lane changing signaling device that employs a rotary electrical connector joined to the steering wheel. None of these systems takes into account that a contour of a lane is constantly changing as one is driving along a roadway. For example, a driver needs to turn a steering wheel in order to steer a vehicle such that it stays within a curved lane. Also, a wheel of a vehicle may be steered towards a right direction (i.e., from a driver's perspective), but yet, the vehicle may be moving towards an adjacent left lane, and vice versa. Because the above described systems activate exterior signal lights based on a rotation of a steering wheel or a turning angle of the wheels of a vehicle, the above described systems would inaccurately activate exterior turn signal lights when the vehicle is making a lane change, and sometimes, even when the vehicle is not making a lane change. Furthermore, different drivers have different driving styles. For example, some drivers tend to sway left and right within a lane more often than other drivers. As such, it would be inaccurate and unreliable to activates exterior turn signal lights based on a rotation of a steering wheel or a turning angle of the wheels of a vehicle.

For the foregoing, it would be advantageous to have an automatic turn signal system that can automatically and reliably activate exterior turn signal lights of a vehicle while making lane changes and turns at intersections. It would also be desirable to have an automatic turn signal system that operates independent of a steering direction of a vehicle, and accounts for a changing contour of a lane in which a vehicle is traveling. Furthermore, it would also be advantageous to have an automatic turn signal system that is adjustable according to the individual driving style of each driver.

SUMMARY

In accordance with some embodiments, an automatic signaling system includes a processor having an input for receiving a signal from a sensor, and an output configured to be coupled to a signaling system of a vehicle, the signaling system having a turn signal light, wherein the processor is configured to automatically activate the turn signal light based at least in part on the signal received from the sensor.

In accordance with other embodiments, a method for activating a turn signal light of a vehicle includes receiving a signal from a sensor, and automatically activating the turn signal light of the vehicle based at least in part on the received signal.

In accordance with other embodiments, a computer program product for use with an automatic signaling system of a vehicle, the computer program product having a set of instruction, the execution of which causes a process to be performed, wherein the process includes automatically activating a turn signal light of the vehicle based at least in part on a signal received from a sensor.

In accordance with other embodiments, a control for use with an automatic signaling system of a vehicle includes a lever for activating a turn signal light of a vehicle, the lever having a first end, a second end, and a body extending between the first and the second ends, and a switch located on the lever, the switch operable to activate or deactivate the automatic signaling system of the vehicle.

In accordance with other embodiments, a control for use with an automatic signaling system of a vehicle includes a lever for activating a turn signal light of a vehicle, the lever having a first end, a second end, and a body extending between the first and the second ends, the first end being movable in a first direction to activate the automatic signaling system of the vehicle.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings depict only typical embodiments and are not therefore to be considered limiting in the scope of the invention.

FIG. 8 is a diagram illustrating a path of a vehicle that is swaying left and right as the vehicle is traveling within a lane;

FIG. 9A illustrates a switch for activating and deactivating an automatic signaling system in accordance with some embodiments;

FIG. 9B illustrates a switch for activating and deactivating an automatic signaling system in accordance with other embodiments.

DETAILED DESCRIPTION OF THE ILLUSTRATED EMBODIMENTS

Figure 1:
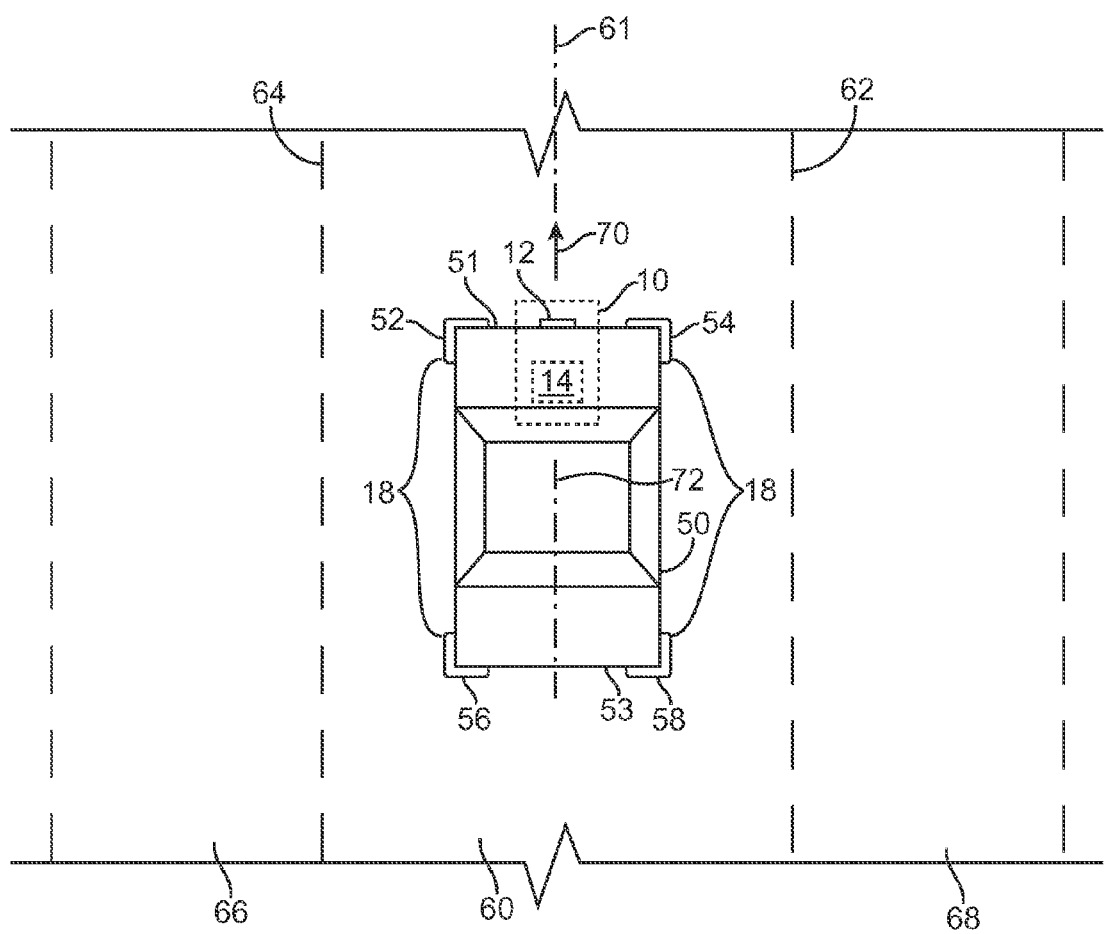
FIG. 1 illustrates a top view of a vehicle having an automatic signaling system that includes a sensor and a processor in accordance with some embodiments.

Various embodiments are described hereinafter with reference to the figures. It should be noted that the figures are not drawn to scale and elements of similar structures or functions are represented by like reference numerals throughout the figures. It should also be noted that the figures are only intended to facilitate the description of illustrated embodiments. They are not intended as an exhaustive description of the invention or as a limitation on the scope of the invention. In addition, an aspect described in conjunction with a particular embodiment is not necessarily limited to that embodiment and can be practiced in any other embodiments.

Automatic Signaling System

Figure 1A:
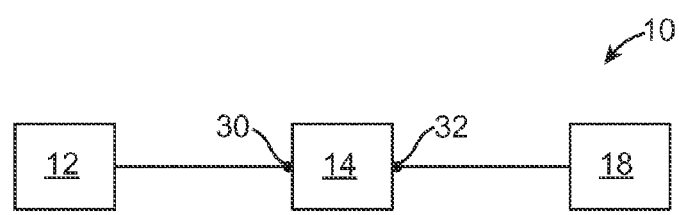
FIG. 1A illustrates the automatic signaling system of FIG. 1.

FIG. 1 illustrates a vehicle 50 having an automatic signaling system 10 in accordance with some embodiments. The vehicle 50 includes a turn signaling system 18 having left turn signal lights 52, 56 and right turn signal lights 54, 58. In other embodiments, the turn signaling system 18 also includes additional turn signal lights at the exterior side mirrors of the vehicle 50. The left turn signal lights 52, 56 are located at a front end 51 and a rear end 53, respectively, and the right turn signal lights 54, 58 are located at the front end 51 and the rear end 53, respectively, of the vehicle 50. The automatic signaling system 10 includes a sensor 12, and a processor 14 coupled to the sensor 12. The sensor 12 is mounted to the front end 51 of the vehicle 50, and is configured to sense a characteristic of an environment in which the vehicle 50 is traveling, and generate a signal representative of the sensed characteristic of the environment. As shown in FIG. 1A, the processor 14 has an input 30 coupled to the sensor 12 for receiving signal from the sensor 12, and an output 32 coupled to the turn signaling system 18 of the vehicle 50. The processor 14 is configured to receive signal from the sensor 12 via the input 30, and transmit an activating signal via the output 32 to activate the left turn signal lights 52, 56, or the right turn signal lights 54, 58 of the vehicle 50 based at least on the signal received from the sensor 12. The automatic signaling system 10 may or may not include the turn signaling system 18 of the vehicle 20. In some embodiments, the processor 14 is coupled to the sensor 12 via a cable that includes at least one wire. In such cases, the sensor 12 transmits signal to the processor 14 via the cable. Alternatively, the automatic signaling system 10 does not include the cable, but a wireless transmitter and a wireless receiver. In such cases, the sensor 12 transmits signal to the processor 14 using the wireless transmitter, and the processor 14 receives the signal using the wireless receiver. In other embodiments, other types of signal communicating devices can also be used to transmit and receive signals to and from the sensor 12 and the processor 14. Although the sensor 12 and the processor 14 are shown as separate components, in some embodiments, the sensor 12 and the processor 14 can be integrated as a single unit. In addition, although the processor 14 is illustrated as being mounted at a front of the vehicle 50, in alternative embodiments, the processor 14 can be mounted to other locations in the vehicle 50.

In the illustrated embodiments, the sensor 12 includes a camera, such as a charge coupled device (CCD) camera, for capturing an image of at least a portion of a lane 60 in which the vehicle 50 is traveling. Alternatively, the sensor 12 can include other optical devices know in the art for capturing an image of at least a portion of the lane 60. In some embodiments, the sensor 12 is rotatably mounted to the vehicle 50 such that a viewing direction can be adjusted. For example, the sensor 12 can include a first hinge connection that allows the sensor 12 to be rotated about a vertical axis, and/or a second hinge connection that allows the sensor 12 to be rotated about a horizontal axis. The sensor 12 can also be slidably mounted to the vehicle 50 such that an elevation of the sensor 12 can be adjusted. In other embodiments, the sensor 12 is fixedly mounted to the vehicle 50, and cannot be positioned.

It should be noted that the type of sensor 12 that may be used is not limited to the examples discussed previously, and that other types of sensor can also be used to sense at least a portion of the lane 60. For example, in some embodiments, the sensor 12 may be a light sensor. In such cases, the sensor 12 is configured to sense light reflected by a reflector of a lane, and light signal is then transmitted from the sensor 12 to the processor 14 for processing. A light source may be secured adjacent the sensor 12 to generate light that may be reflected by a reflector of a lane. In such cases, the processor 14 can analyze the light signal to determine whether it is that associated with a lane boundary. For example, a frequency, intensity, color, size, and/or a shape of the light signal may be processed by the processor 14 to determine whether the light signal is associated with a lane identifier, a head light of a car, a reflector of a car, or other light elements, such as a street light. In some embodiments, the processor 14 includes a memory that stores a set of reference data. Each reference data contains one or more variables that are associated with a lane identifier. For example, a reference data can be "red", which corresponds with the color of a possible lane identifier. In such cases, the processor 14 is configured to compare at least a portion of the image signal from the sensor 12 with the reference data to determine if the portion of the image signal has a characteristic that matches with the reference data. Following the above example, the processor 14 will analyze the image signal to determine if at least a portion of the image signal has a red color light. If so, then the processor 14 identifies the portion as a potential lane marker. In other embodiments, the automatic signaling system 10 can include other types of transmitter, such as an infrared transmitter or a radio frequency transmitter, that transmits a signal or energy to a surface of the road, and a corresponding sensor for sensing a reflected signal or energy. In other embodiments, the sensor 12 can also be a color sensor for sensing a color associated with a lane boundary. In further embodiments, the sensor 12 can include an infrared device, a laser device, or any of the devices described in U.S. Pat. Nos. 4,348,652, 5,979, 581, 5,790,403, 5,957,983, and 5,982,278, and U.S. Patent Application Publication No. 2002/0175813, for detecting a presence or an absence of a lane boundary.

The processor 14 can be one of a variety of types of devices. In the illustrated embodiments, the processor 14 includes an application-specific integrated circuit (ASIC), such as a semi-custom ASIC processor or a programmable ASIC processor. ASICs, such as those described in Application-Specific Integrated Circuits by Michael J. S. Smith, Addison-Wesley Pub Co. (1st Edition, June 1997), are well known in the art of circuit design, and therefore will not be described in further detail herein. The processor 14 can also be a processor known in the art of signal processing. For example, the processor 14 can be a lane-sensing processor, such as that available from MobilEye N.V., Netherlands. In alternative embodiments, the processor 14 can include a general purpose processor, such as a Pentium processor. It should be noted that the processor 14 is not limited to those described previously, and that the processor 14 can be any of a variety of circuits or devices that are programmed and/or constructed to perform the functions described herein. In some embodiments, the processor 14 can be a processor associated with a computer or the computer itself. The processor 14 should be capable of performing calculation and/or processing of image signals at sufficient speed so that substantial real-time output can be generated. Substantial real-time output is an output that is generated without significant lag time due to processing. Since road condition can change within a short period, it is preferable to use a fast processor. In some embodiments, the processor 14 may also include a medium for storing programmed instructions and/or data.

Examples of Techniques Used by the Automatic Signaling System

Embodiments of a method of using the automatic signaling system 10 will now be described. When using the automatic signaling system 10, the sensor 12 captures images of the lane 60 in which the vehicle 50 is traveling and transmits image signals to the processor 14. The processor 14 analyzes the image signals to determine if the vehicle 50 is making a lane change based on a prescribed criteria. If it is determined that the vehicle 50 is making a lane change, the processor 14 then activates appropriate turn signal lights 52, 54, 56, 58 of the vehicle 50.

Figure 2A:
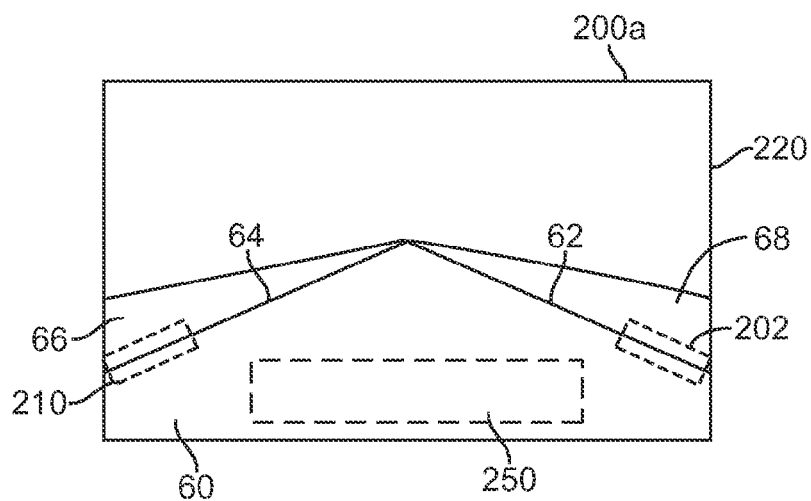
FIGS. 2A-2C illustrates images captured by the sensor of the automatic signaling system of FIG. 1.
Figure 2B:
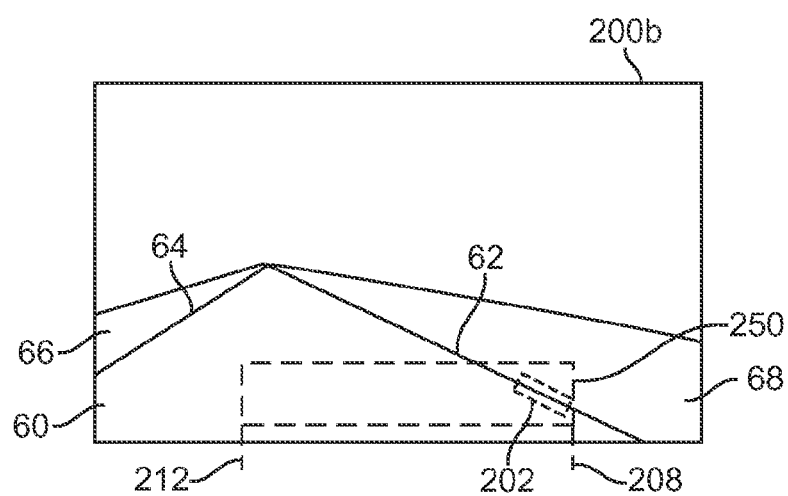
Figure 2C:
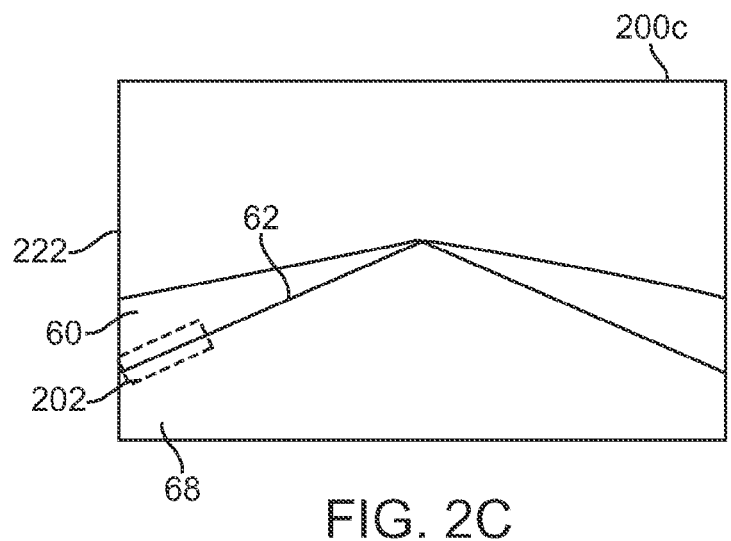

FIG. 2A shows a graphic representing an image (or image frame) 200a that has been captured by the sensor 12 when the vehicle 50 is traveling approximately along a center line 61 of the lane 60 in a direction represented by arrow 70. The image 200a includes an image of a first (right) boundary 62 and a second (left) boundary 64 of the lane 60 in which the vehicle 50 is traveling. In the illustrated embodiments, the lane boundaries 62, 64 are shown as dashed lines. Alternatively, either of the lane boundaries 62, 64 can be a solid line, double solid lines, double dashed lines, or other types of line. FIG. 2B shows a graphic representing another image 200b that has been captured by the sensor 12 when the vehicle 50 is making a lane change. In such case, the vehicle 50 has traveled substantially away from the center line 61 of the lane 60, and is moving towards the right boundary 62 of the lane 60. FIG. 2C shows a graphic representing another image 200c that has been captured by the sensor 12 when the vehicle 50 has completed a lane change maneuver and is traveling within lane 68. The processor 14 is configured to analyze images (e.g., the images 200a-200c) transmitted from the sensor 12, and determine whether a prescribed criteria representing the vehicle 50 making a lane change is met. If the criteria is met, the processor 14 then selectively activates the right turn signal lights 54, 58 or the left turn signal lights 52, 56 that correspond to the direction of the lane change. It should be understood by those skilled in the art that the images 200a-200c are graphical representation of image data generated by the sensor 12, and that the image data need not be displayed in visual form. As such, the term "image" refers to both displayed image and image data/signal that is not displayed.

In some embodiments, the processor 14 locates at least a portion 202 of the right boundary 62 in each of the images 200a-c, and determines whether to activate the turn signal lights of the vehicle 50 based on a position of the portion 202 relative to each of the images 200a-c. For example, when the vehicle 50 is traveling along the center line 61 of the lane 60, the portion 202 of the right boundary 62 is located adjacent a right side 220 of the image frame 200a (FIG. 2A). When the vehicle 50 has traveled substantially away from the center line 61 of the lane 60, the portion 202 shifts away from the side 220 of the image frame and is located closer to a center of the image 200b (FIG. 2B). When the vehicle 50 has completely moved into the adjacent right lane 68, the portion 202 is located adjacent a left side 222 of the image frame 200c (FIG.

2C). As such, by observing the portion 202 of the right boundary 62 in images generated by the sensor 12, the processor 14 can determine a position of the vehicle 50 relative to the lane 60 in which it is traveling based on a position of the portion 202 in the images. If the vehicle 50 is within a prescribed distance, such as 0 to 3 feet, and preferably 0 to 6 inches, from the right boundary 62, then the processor 14 considers the vehicle 50 as making a lane change maneuver towards the adjacent right lane 68, and activates the right turn signal lights 54, 58. Similarly, if the vehicle 50 is within a prescribed distance, such as 0 to 3 feet, and preferably 0 to 6 inches, from the left boundary 64, then the processor 14 considers the vehicle 50 as making a lane change maneuver towards the adjacent left lane 66, and activates the left turn signal lights 52, 56. In some embodiments, the processor 14 is configured to monitor the position of only the portion 202 of the right boundary 62, and determine whether to activate the turn signaling system 18 based on the position of the portion 202 of the right boundary 62. In other embodiments, the processor 14 is configured to monitor only the position of a portion 210 of the left boundary 64, and determine whether to activate the turn signaling system 18 based on the position of the portion 210 of the left boundary 64. In other embodiments, the processor 14 is configured to monitor both the positions of the portions 202, 210 of the respective lane boundaries 62, 64, and determine whether to activate the turn signaling system 18 based on the positions of the portions 202, 210. As used in this specification, the terms, "portion" (of a boundary), and "boundary", each refers to any physical objects that define a lane boundary, and includes one or more lane markers, one or more reflectors, road paint, or other objects.

In some embodiments, a right boundary 208 in an image frame can be prescribed, such that, when the vehicle 50 is within a prescribed distance, such as 0 to 3 feet, and more preferably, 0 to 6 inches, from the right boundary 62 of the lane 60, the image of the portion 202 of the right boundary 62 would appear to the left of the boundary 208 in an image frame (FIG. 2B). In such cases, when the portion 202 appears to the left of the boundary 208 (indicating that the vehicle 50 is within the prescribed distance from the right boundary 62), the processor 14 activates the right turn signal lights 54, 58 of the turn signaling system 18. Similarly, a left boundary 212 can be prescribed, such that, when the vehicle 50 is within a prescribed distance, such as 0 to 3 feet, and more preferably, 0 to 6 inches, from the left boundary 64, the image of the portion 210 of the left boundary 64 would appear to the right of the boundary 212 in an image frame. In such cases, when the portion 210 appears to the right of the boundary 212 (indicating that the vehicle 50 is within the prescribed distance from the left boundary 64), the processor 14 activates the left turn signal lights 52, 56 of the turn signaling system 18.

As shown in the above described embodiments, the processor 14 activates the turn signaling system 18 of the vehicle 50 independent of an angle of a turning wheel of the vehicle 50. Such configuration is advantageous in that it prevents or reduces the risk of an untimely and/or an inaccurate activation of the turn signaling system 18. For example, in some situations, a vehicle 50 may be steered towards a right direction as it is traveling in a curve lane, while moving towards an adjacent left lane. In such cases, if an automatic activation of the turn signaling system 18 depends on a turning angle of the wheels of the vehicle 50, the turn signaling system 18 may not be timely or correctly activated since the wheels of the vehicle 50 are turned towards a right direction that is opposite or different from a direction (i.e., the left direction) of lane change. Because the automatic signaling system 10 does not rely a turning angle of the wheels to activate the turn signaling system 18, the automatic signaling system 10 (or any of the embodiments of the automatic signaling system described herein) can accurately and timely detect the lane change maneuver of the vehicle 50.

In the above described embodiments, the portions 202, 210 of the right and left boundaries 62, 64, respectively, determined by the processor 14 are the portions of the boundaries 62, 64 that are relatively closer to the vehicle 50 as they appear within the image frame. Using the portions 202, 210 of the boundaries 62, 64 that are closer to the vehicle 50 is advantageous in that the positions of the portions 202, 210 in the image frames do not change significantly when the vehicle 50 is traveling substantially along the center line 61 of the lane 60. This is so even when the vehicle 50 is traveling within a curved lane. Sometimes, the processor 14 may not be able to detect the portions 202, 210 that are adjacent or relatively closer to the vehicle 50. In such cases, the processor 14 can be configured to estimate positions of the portions 202, 210 based on images of other portions of the boundaries 62, 64 that are located further away from the vehicle 50. For example, the processor 14 can perform curve fitting functions to determine lines that best align with the detected portions of the boundaries 62, 64. Based on the determined lines, the processor 14 can estimate the portions 202, 210 of the respective boundaries 62, 64 that are adjacent or relatively closer to the vehicle 50.

The processor 14 can use one of a variety of image processing techniques to identify images of the boundaries 62, 64 in image frames. For example, known filtering, background subtraction, and discrimination techniques can be used. The processor 14 can also perform color analysis, shape recognition, and landmark identification, to determine whether an image in an image frame is that associated with either or both of the boundaries 62, 64. For example, processors for performing image recognition, such as those available from Mobileye N.V., Netherlands, may be used. In some embodiments, the processor 14 uses a position of an image of a boundary in a previous image frame to estimate a location of an image of a boundary in a current image frame. This is advantageous in that the processor 14 does not need to scan through an entire image frame to identify an image of a lane boundary, thereby reducing processing time. In other embodiments, the processor 14 uses a position of a portion of a boundary in a previous image frame, and operation data (e.g., speed, acceleration, and/or steering direction) of the vehicle 50, to estimate a current position of the portion of the boundary in the current image frame. In alternative embodiments, the processor 14 can be configured to compare a portion of an image frame with a set of stored templates to determine if the portion of the image frame contains an image of a lane boundary. In such cases, each of the stored templates contains an image of at least a portion of a lane boundary. The images of the templates can be actual images (e.g., real pictures), or alternatively, artificially created images, of lane boundaries having different characteristics. For examples, different templates can be provided for lane boundaries that have different width, color, brightness, and spacing of lane markers. Different templates can also be provided for lane boundaries having different appearances when a vehicle is traveling at different speeds. If a portion of an image frame matches with one of the templates, then an image of a lane boundary is considered identified. It should be noted that other techniques can also be used, and that the scope of the invention should not be limited by the examples of technique described herein.

In the above described embodiments, the processor 14 is configured to identify image of the lane boundaries 62, 64 wherever they appear within an image frame. In alternative embodiments, the processor 14 can be configured to monitor a prescribed area 250 in image frames. In such cases, when the vehicle 50 is traveling along the center line 61 of the lane 60, the prescribed area 250 in the image 200a does not have an image of the lane boundaries 62, 64 (FIG. 2A). When the vehicle 50 is traveling substantially away from the center line 61 of the lane 60 and is moving towards the right lane 68, a portion of the right boundary 62 would appear from a right side in the prescribed area 250 (FIG. 2B). As the vehicle 50 continues to move towards the right lane 68, the portion of the right boundary 62 appeared in the prescribed area 250 would shift from right to left in successive image frames. Similarly, when the vehicle 50 is traveling substantially away from the center line 61 of the lane 60 and is moving towards the left lane 66, an image of a portion of the left boundary 64 would appear from a left side in the prescribed area 250. As the vehicle 50 continues to move towards the left lane 66, the portion of the left boundary 64 appeared in the prescribed area 250 would shift from left to right in successive image frames. As such, by observing images in the prescribed area 250 within image frames, the processor 14 can determine whether the vehicle 50 is traveling approximately along the center line 61 of the lane 60 based on a presence or absence of an image of the right boundary 62 or the left boundary 64 in the prescribed area 250. Also, by identifying an image of a portion of the boundary within the prescribed area 250 in successive image frames, the processor 14 can determine whether the vehicle 50 is traveling towards the left lane 66 or the right lane 68. If the processor 14 determines that the vehicle 50 is traveling towards the right lane 68, the processor 14 then activates the right turn signal lights 54, 58. If the processor 14 determines that the vehicle 50 is traveling towards the left lane 66, the processor 14 then activates the left turn signal lights 52, 56.

In the above described embodiments, the sensor 12 is mounted such that it can capture an image of the lane boundaries 62, 64 in front of the vehicle 50 as the vehicle 50 is traveling along the center line 61 of the lane 60. However, such needs not be the case. In other embodiments, the sensor 12 is mounted to the front end 51 of the vehicle 50 such that the sensor 12 aims towards a road surface adjacent to the front end 51 of the vehicle 50. For example, the sensor 12 can be configured to aim towards an area of the road in front of the vehicle 50 that is between 0 to 10 feet from the front end 51 of the vehicle 50. In such cases, when the vehicle 50 is traveling along the center line 61 of the lane 60, an image frame captured by the sensor 12 includes only an image of a road surface between the lane boundaries 62, 64, and therefore, does not include an image of the lane boundaries 62, 64. However, as the vehicle 50 is traveling away from the center line 61 of the lane 60 and towards the adjacent right lane 68, the sensor 12 captures an image of a portion of the right boundary 62 that has "moved" into a field of aiming of the sensor 12. Similarly, as the vehicle 50 is traveling away from the center line 61 of the lane 60 and towards the adjacent left lane 66, the sensor 12 captures an image of a portion of the left boundary 64 that has "moved" into a field of aiming of the sensor 12. By determining a position of the image of the boundary 62 or 64 as it appears in the image frame, and/or a direction in which the image of the boundary 62 or 64 appears to be moving in successive frames, the processor 14 can determine whether the vehicle 50 is traveling towards the right lane 68 or the left lane 66, and activates the appropriate turn signal lights accordingly.

It should be noted that the above described embodiments are examples of techniques that can be used to determine a position of the vehicle 50 relative to the lane 60, and that other techniques can be employed. For examples, in other embodiments, the processor 14 can be configured to determine a line that best align with image of a portion of a lane boundary, and determine whether the vehicle 50 is traveling out of lane 60 based on a characteristic, such as a curvature, a shape, a position, and an orientation, of the determined line. In other embodiments, the processor 14 can also determine an orientation of the vehicle 50 relative to the lane 60 based on one or more characteristics (e.g., position, orientation, and/or shape) of a lane boundary as it appears in an image frame. In such cases, if an axis 72 of the vehicle 50 is within a prescribed angle, such as 10° to 90°, from an instantaneous tangent of a contour of the lane 60, then the processor 14 considers the vehicle 50 as making a lane change and activates appropriate turn signal lights. Also, in other embodiments, the processor 14 can be configured to predict a future position of a portion of a boundary in a future image frame, based on a position of a portion of the boundary in a previous image frame, and operation data (e.g., speed, acceleration, and steering direction) of the vehicle 50. In such cases, the predicted position can be verified subsequently to determine whether the vehicle 50 is making a lane change maneuver.

Figure 3A:
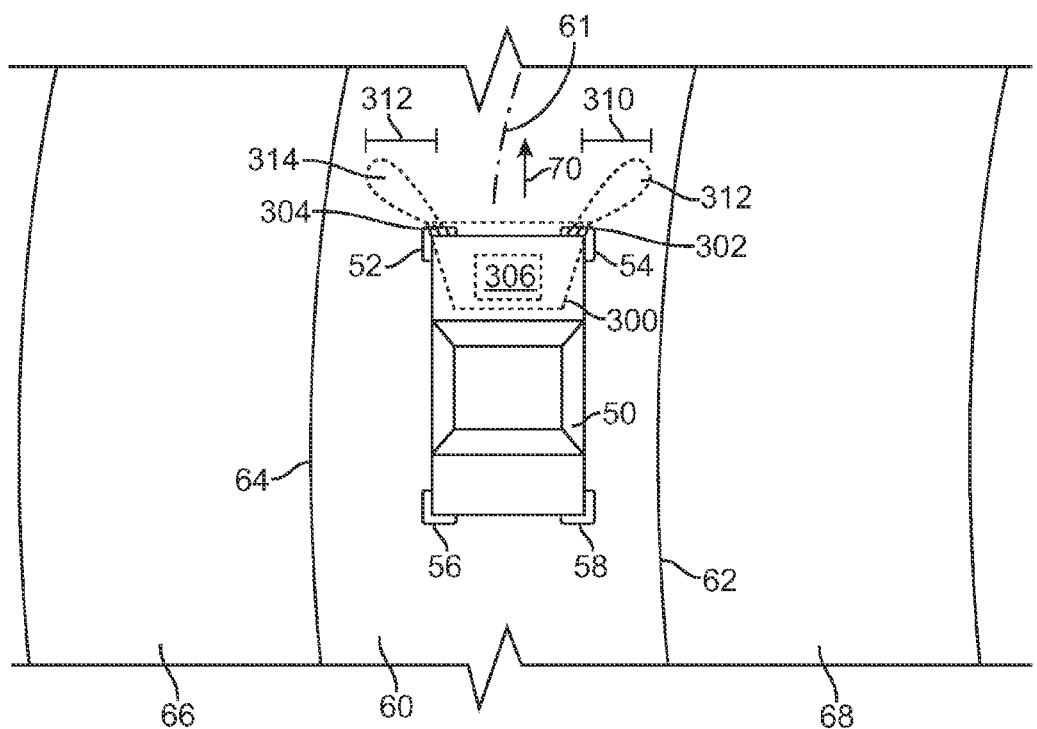
FIG. 3A illustrates a top view of a vehicle having an automatic signaling system in accordance with other embodiments, showing the automatic signaling system having two sensors.
Figure 3B:
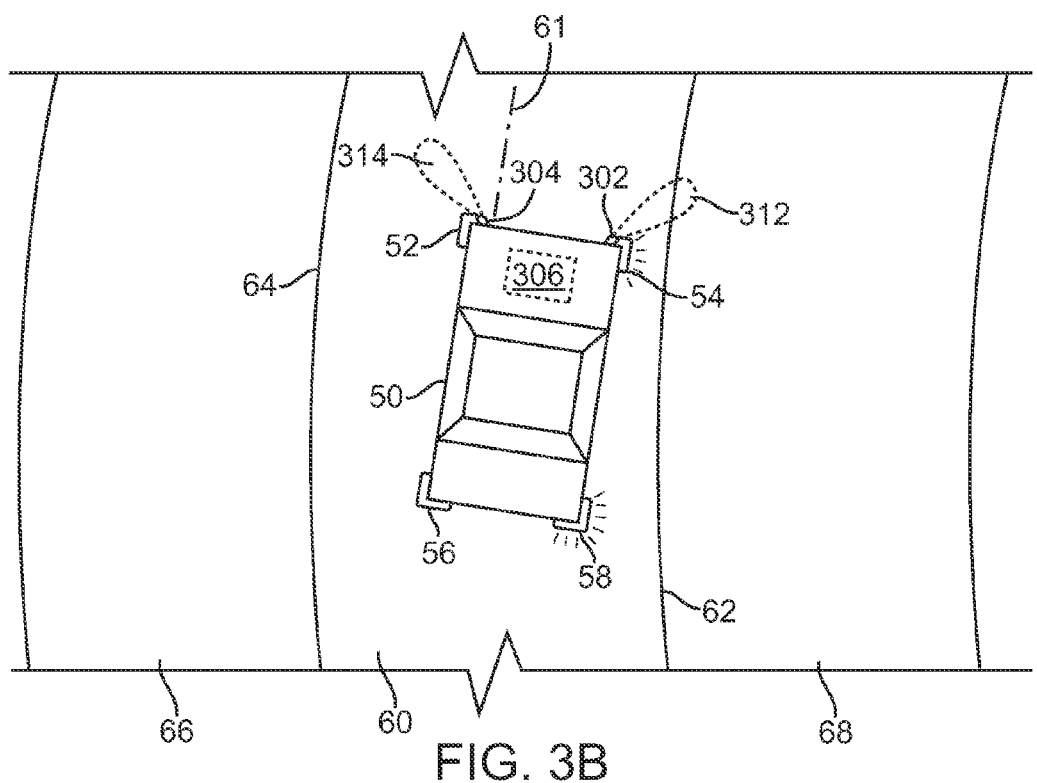
FIG. 3B illustrates the top view of the vehicle of FIG. 3A, showing the vehicle making a lane change maneuver.

In the above described embodiments, one sensor is used to capture images of at least a portion of the lane 60. However, in alternative embodiments, the automatic signaling system 10 can include more than one sensor. FIG. 3A illustrates an automatic signaling system 300 in accordance with other embodiments. The automatic signaling system 300 includes a first sensor 302, a second sensor 304, and a processor 306 coupled to the sensors 302, 304. In the illustrated embodiments, both sensors 302, 304 are mounted to the front end 51 of the vehicle 50, with the first sensor 302 located at a right side and the second sensor 304 located at a left side of the vehicle 50. Particularly, the first sensor 302 is mounted such that it can capture an image of a road surface that is within a lateral distance 310 from the right side of the vehicle 50. Similarly, the second sensor 304 is mounted such that it can capture an image of a road surface that is within a lateral distance 312 from the left side of the vehicle 50. In some embodiments, the distances 310, 312 can be anywhere between 0 to 3 feet, and more preferably 0 to 6 inches. If the vehicle 50 is traveling approximately along the center line 61 of the lane 60, the images captured by the sensors 302, 304 would not include an image of the lane boundaries 62, 64. However, when the vehicle 50 is traveling substantially away from the center line 61 of the lane 60 and towards the adjacent right lane 68, an image field 312 of the first sensor 302 will intercept the right boundary 62, thereby capturing an image of the right boundary 62 (FIG. 3B). Similarly, when the vehicle 50 is traveling substantially away from the center line 61 of the lane 60 and towards the adjacent left lane 66, an image field 314 of the second sensor 304 will intercept the left boundary 64, thereby capturing an image of the left boundary 64. As similarly discussed previously, the processor 306 analyzes image signals transmitted from the sensors 302, 304 to determine if an image of a lane boundary has been captured. If it is determined that an image frame contains an image of a lane boundary, the processor 306 then activates the appropriate turn signal lights of the turn signaling system 18.

It should be noted that any of the techniques discussed previously with reference to the automatic signaling system 10 can similarly be used by the automatic signaling system 300. For example, in other embodiments, the first and the second sensors 302, 304 can be mounted to the vehicle 50 such that they can capture the right and left boundaries 62, 64, respectively, of the lane 60 when the vehicle 50 is traveling along the center line 61 of the lane 60. In such cases, the processor 306 can analyze the images, and determines whether the vehicle 50 is making a lane change based on a characteristic, such as a position and/or an orientation, of the boundaries 62, 64 as they appear in image frames.

In the above described embodiments, the sensor 12 (or the sensors 302, 304) is mounted near the front end 51 of the vehicle 50. However, in alternative embodiments, the sensor 12 (or the sensors 302, 304) can be mounted at other locations. For examples, the sensor 12 (or either of the sensors 302, 304) may be secured to a roof, a hood, a side mirror, a rear view mirror (e.g., mirror that is secured to a front windshield or roof), a bottom frame, or other part(s) of the vehicle 50. Also, in other embodiments, the sensor 12 (or the sensors 302, 304) can be mounted such that it aims at other areas adjacent the vehicle 50.

Figure 4:
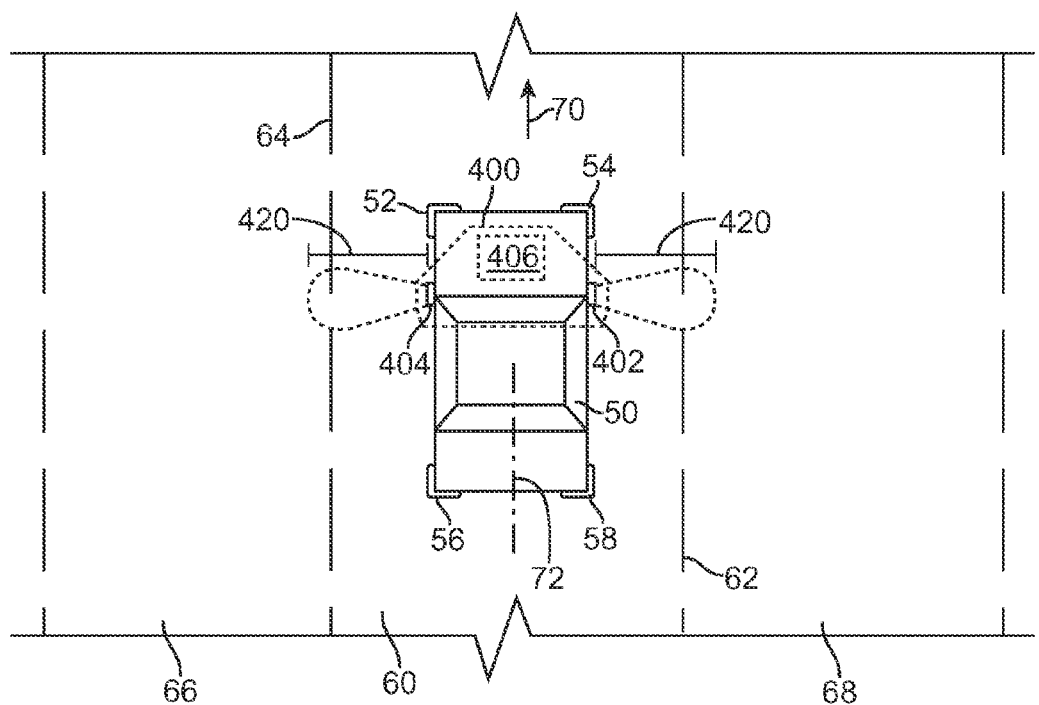
FIG. 4 illustrates a top view of a vehicle having an automatic signaling system in accordance with other embodiments, showing the automatic signaling system having two sensors mounted on respective left and right sides of the vehicle.

FIG. 4 illustrates an automatic signaling system 400 in accordance with other embodiments. The automatic signaling system 400 includes a first sensor 402, a second sensor 404, and a processor 406 coupled to the sensors 402, 404. The sensors 402, 404 are similar to the sensors 302, 304, and the processor 406 is similar to the processor 306 described previously. The first sensor 402 is mounted to a right side of the vehicle 50, and the second sensor 404 mounted to a left side of the vehicle 50 such that the first and the second sensors 402, 404 can capture images of the right and left boundaries 62, 64, respectively.

Figure 5A:
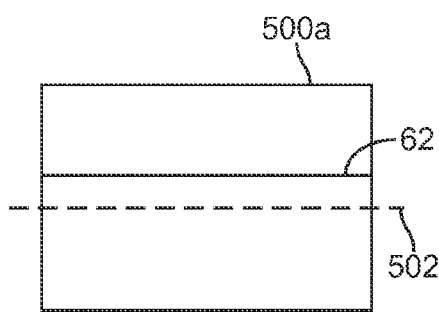
FIG. 5A-5D illustrates images captured by the sensor of the automatic signaling system of FIG. 4.
Figure 5C:
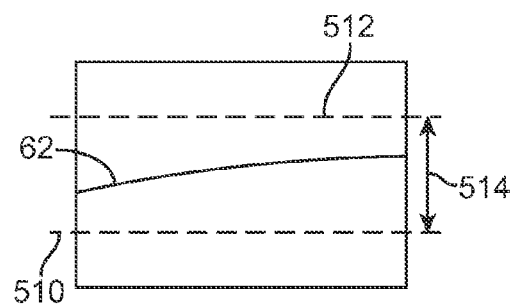
Figure 5B:
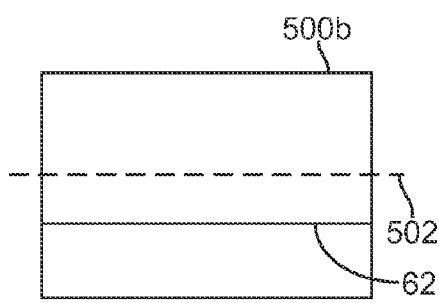

FIG. 5A shows a graphic representing an image (or image frame) 500a that has been captured by the first sensor 402 when the vehicle 50 is traveling approximately along a center line 61 of the lane 60 in a direction represented by the arrow 70. The image 500a includes an image of the right boundary 62 in which the vehicle 50 is traveling. FIG. 5B shows a graphic representing another image 500b that has been captured by the first sensor 402 when the vehicle 50 is making a lane change. In such case, the vehicle 50 has traveled substantially away from the center line 61 of the lane 60, and is moving towards the right boundary 62 of the lane 60. As can be seen from the image 500b, as the vehicle 50 travels towards the right boundary 62, the position of the image of the right boundary 62 shifts downward towards a bottom of an image frame. The processor 406 is configured to determine whether the image of the right boundary 62 is below or above a threshold position, such as that represented by the dotted line 502. If the position of the image of the right boundary 62 is above the threshold position, the processor 406 does not activate the turn signaling system 18 of the vehicle 50. On the other hand, if the position of the image of the right boundary 62 in an image frame is below the threshold position, the processor 406 then activates the right turn signal lights 54, 58 of the vehicle 50. Operation of the second sensor 404 is similar to that discussed with reference to the first sensor 402, and therefore, will not be described in further details.

In some embodiments, the processor 406 is configured to analyze images from both sensors 402, 404. In such cases, data from both sensors 402, 404 are processed by the processor 406 to determine whether the vehicle 50 is traveling towards the right lane 68 or the left lane 66. In other embodiments, the processor 406 is configured to analyze images from the right sensor 402 only. In such cases, the automatic signaling system 400 includes an additional processor for analyzing images from the second sensor 404. Results of the analysis of images from both sensors 402, 404 are then correlate with each other to determine whether the vehicle 50 is traveling towards the right lane 68 or the left lane 66.

In some embodiments, instead of using both sensors 402, 404, the automatic signaling system 400 has only one sensor (e.g., the sensor 402) mounted to a side (e.g., a right side) of the vehicle 50. In such cases, the processor 406 can determine whether the vehicle 50 is traveling towards the right lane 68 or the left lane 66 based on a position of an image of the right boundary 62 relative to a first threshold 510 and a second threshold 512 in an image frame (FIG. 5C). In such cases, if the image of the right boundary 62 is between the first and the second thresholds 510, 512, in an image frame, the vehicle 50 is considered as not making a lane change, and the processor 406 does not activate the turn signaling system 18 of the vehicle 50. If the image of the right boundary 62 is below the first boundary 510 (indicating that the vehicle 50 has traveled closer towards the right boundary 62), the processor 406 then activates the right turn signal lights 54, 58 of the vehicle 50. On the other hand, if the image of the right boundary 62 is above the second boundary 512 (indicating that the vehicle 50 has traveled towards the left boundary 64), the processor 406 then activates the left turn signal lights 52, 56 of the vehicle 50.

In some embodiments, the threshold 510 (or 512) in an image frame is such that an image of the right boundary 62 will be below the threshold 510 when the vehicle 50 is within about 0 to 3 feet, or more preferably 0 to 6 inches, away from the right boundary 62. Similarly, the threshold 512 in an image frame is such that an image of the right boundary 62 will be above the threshold 512 when the vehicle 50 is within about 0 to 3 feet, or more preferably 0 to 6 inches, away from the left boundary 64. In other embodiments, the thresholds 510, 512 can correspond to distances between the vehicle 50 and the lane boundaries 62, 64 that are different from that described previously.

Figure 5D:
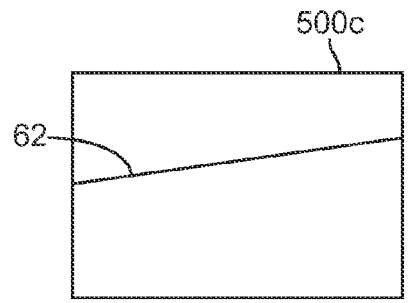

In some embodiments, the processor 406 determines whether to activate the turn signaling system 18 of the vehicle 50 based on an orientation of the vehicle 50 relative to the lane 60. FIG. 5D shows a graphic representing an image 500c captured by the right sensor 402 when the vehicle 50 has turned substantially towards the right lane 68 such that the axis 72 of the vehicle 50 makes an angle with an instantaneous tangent of a contour of the lane 60. As can be seen from the image frame 500c, because the vehicle 50 has turned towards the right boundary 62, the right boundary 62 is slopped as it appears in the image frame 500c. As such, by determining a slope of the right boundary 62 in an image frame, the processor 406 can determine an orientation of the vehicle 50 relative to the lane 60. If a slope of the right boundary 62 in an image frame is greater than a threshold slope, such as 10° or greater, (indicating that the vehicle 50 has turned substantially towards the right lane 68), the processor 406 then activates the right turn signal lights 54, 58 of the vehicle 50. On the other hand, if a slope of the right boundary 62 in an image frame is less than a threshold slope, such as −10° or less, (indicating that the vehicle 50 has turned substantially towards the left lane 66), the processor 406 then activates the left turn signal lights 52, 56 of the vehicle 10. It should be noted that the above described technique is operable even when the vehicle 50 is traveling along a curve lane because the boundary of a lane will appear approximately rectilinear in an image frame. If the boundary of a lane appears curvilinear in an image frame, the processor 406 can determine a straight line that best represents the curved lane boundary.

It should be noted that the technique employed by the automatic signaling system 400 to determine a position of the vehicle 50 relative to the lane 60 should not be limited to that described previously, and that any of the techniques discussed previously with reference to the automatic signaling system 10 or 300 can be similarly employed by the automatic signaling system 400. In addition, any of the embodiments of the automatic signaling system described herein can use more than one criteria to determine whether to activate the turn signaling system 18 of the vehicle 50. For example, the processor 14 can be configured to activate the turn signaling system 18 of the vehicle 50 when (1) the vehicle 50 is within a prescribed distance from one of the lane boundaries 62, 64, and (2) an angle between the axis 72 of the vehicle 50 and an instantaneous tangent of a contour of the lane 60 is above or below a prescribed angle.

For any of the automatic signaling systems described herein, the processor (e.g., the processor 14, 306, or 406) can be further configured to determine a width of a lane in which the vehicle 50 is traveling based on data received from the sensor (e.g., the sensor 12, 302, 304, 402, 404), and adjust a criteria for activating the turn signaling system 18. For example, if a relatively narrow lane is detected, the processor 14 then activates the turn signaling system 18 of the vehicle 50 when the vehicle 50 is, for example, within 0 to 1 foot, from one of the lane boundaries 62, 64. On the other hand, if a relatively wide lane is detected, the processor 14 then activates the signaling system 18 when the vehicle 50 is, for example, within 0 to 2 feet, from one of the lane boundaries 62, 64. In some embodiments, the processor activates the turn signaling system 18 of the vehicle 50 when a side of the vehicle 50 is within a distance $D=k\times(W_l-W_v)/2$ from one of the lane boundaries 62, 64, where k is a value between 0 to 1.0, $W_l$ is a width of the lane 60, and $W_v$ is a width of the vehicle 50. In such cases, a sensitivity of the automatic signaling system can be adjusted by varying the value k (with k=0 corresponding to a minimum sensitivity of the automatic signaling system, and k=1.0 corresponding to a maximum sensitivity of the automatic signaling system). In other embodiments, any of the embodiments of the automatic signaling system described herein can be further configured to adjust a criteria for activating and/or deactivating the signaling system 18 based on other detected conditions, such as, a brightness of an environment, a weather condition, or an operational condition (such as a speed) of the vehicle 50.

Although methods of automatically activating the turn signaling system 18 of the vehicle 50 have been described, any of the techniques described herein can similarly be used to automatically deactivate the turn signaling system 18 of the vehicle 50. Particularly, after turn signal lights of the vehicle 50 have been activated, similar techniques can be used to determine whether the vehicle 50 has completed a lane change. In some embodiments, the processor 14 is configured to monitor a movement of an identified lane marker in image frames, and determines whether a lane change maneuver has been completed based on a position of the lane marker. For example, if the right lane marker 62 has moved from a right side of an image frame to a left side of an image frame, the processor 14 then determines that a lane change maneuver has been completed. If the vehicle 50 has completed a lane change, the automatic signaling system then automatically deactivates (i.e., turn off) the activated turn signal lights. In other embodiments, instead of determining whether the vehicle 50 has completed a lane change, the automatic signaling system automatically deactivates the turn signal lights after the turn signal lights have been activated for a prescribed number of times (e.g., three times), or for a prescribed period (e.g., three seconds).

Although several methods of automatically activating and/or deactivating the turn signaling system 18 of the vehicle 50 have been described, it should be noted that these are only examples of techniques which can be used by the automatic signaling system, and that the scope of the invention should not be so limited. In alternative embodiments, the automatic signaling system can use other techniques to determine a position and/or orientation of the vehicle 50 relative to a lane in which it is traveling, and/or other criteria to determine whether to activate the turn signaling system 18 of the vehicle 50, based on the determined position and/or orientation of the vehicle 50 relative to the lane. It should be understood by those skilled in the art that the specific technique(s) used will depend on a mounting position, mounting orientation, frame rate, field of vision, distance range, and/or type, of the sensor(s) being employed.

Also, in other embodiments, instead of the sensor 12 being an image/optical sensor, the sensor 12 can be other types of sensor. For example, in other embodiments, the sensor 12 of the automatic-signaling system can include a signal receiver configured for receiving information regarding a position of the vehicle 50. As such, the term "sensor" is not limited to image sensing device, and can include signal sensing device. The information can be transmitted from a base station, a satellite, or a component of a global-positioning-system (GPS). In such cases, based on the information received by the sensor 12, the processor 14 then activates a turn-signal light of the vehicle 50. In one application, the information received by the sensor 12 indicates that the vehicle 50 is within a turn lane (i.e., a lane dedicated for making a turn), in which case, the processor 14 then activates the turn-signal light that corresponds with a turn direction associated with the turn lane.

As illustrated in the above embodiments, the automatic signaling system 10 is advantageous in that it automatically activates the signaling system 18 of the vehicle 50 based on a certain prescribed criteria, thereby assisting a driver in making a lane change maneuver. The automatic signaling system 10 can also be used to assist a driver in initiating a lane change maneuver. For example, if the driver of the vehicle 50 desires to make a lane change to the right lane 68, the driver can simply turn the steering wheel slightly to steer the vehicle 50 to move closer to the right lane boundary 62, thereby causing the processor 54 to automatically activates the signaling system 18. As such, the driver can activate the signaling system 18 of the vehicle 50 conveniently and without moving his/her hand away from the steering wheel.

Automatic Signaling System with Speed Sensing Capability

Figure 6A:
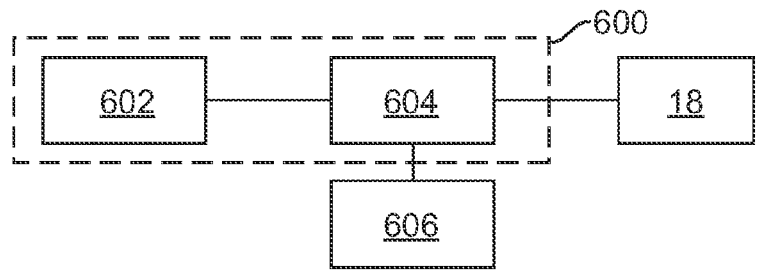
FIG. 6A illustrates a schematic block diagram of an automatic signaling system that has speed sensing capability in accordance with other embodiments.

FIG. 6A illustrates a schematic block diagram of an automatic signaling system 600 in accordance with other embodiments. The automatic signaling system 600 includes a sensor 602, and a processor 604 coupled to the sensor 602. The sensor 602 is configured for sensing a condition of an environment in which the vehicle 50 is traveling, and the processor 604 is configured to automatically activate and/or deactivate the turn signaling system 18 of the vehicle 50 based at least in part on the sensed condition by the sensor 602. The sensor 602 and the processor 604 can be any of the sensors and processors, respectively, described herein, and the operations and functionalities of the sensor 602 and the processor 604 are similar to those described previously. However, unlike the previously described embodiments, the processor 604 of the automatic signaling system 600 is further configured to be coupled to a speed sensor 606 for sensing a speed of the vehicle 50. The speed sensor 606 can be a speed sensor that is already included with the vehicle 50, or alternatively, a separate speed sensor. The automatic signaling system 600 may or may not include the speed sensor 606.

During use, the processor 604 receives data from the speed sensor 606 regarding a speed of the vehicle 50, and uses the speed data as a criteria for allowing automatic control of the turn signaling system 18 of the vehicle 50. In such cases, the processor 604 does not allow automatic activation of the signaling system 18 when the vehicle 50 is traveling below a prescribed speed. A prescribed speed can be 35 mph, 45 mph, 55 mph, 65 mph, or other speed limits. As such, the signaling system 18 of the vehicle 50 can only be activated manually when the vehicle 50 is traveling below the prescribed speed. However, when the vehicle 50 is traveling above the prescribed speed, the processor 604 then controls an activation and/or deactivation of the turn signaling system 18, as similarly discussed previously.

In other embodiments, the automatic signaling system 600 includes a switch (not shown) that is coupled to the speed sensor 606. In such cases, the switch activates and deactivates the sensor 602 and/or the processor 604, or block signals from the processor 604 to the turn signaling system 18, when a speed of the vehicle 50 is below a prescribed speed. When the vehicle 50 is traveling above the prescribed speed, the switch activates the sensor 602 and/or the processor 604, or allows signals be transmitted from the processor 604 to the signaling system 18, thereby allowing the processor 604 to control the turn signaling system 18. The switch can be a separate component from the processor 604, or alternatively, be a part of the processor 604.

In other embodiments, instead of, or in addition to, using the speed data for allowing control of the turn signaling system 18, the speed data can also be used to determine a criteria for activating the turn signaling system 18. In such cases, the processor 604 selects different criteria for activating the turn signaling system 18 of the vehicle 50 based on a speed data received from the speed sensor 606. For example, when the vehicle 50 is traveling above a prescribed speed (e.g., 55 mph), the automatic signaling system 600 automatically activates the turn signaling system 18 of the vehicle 50 when the vehicle 50 is, for example, less than 12 inches, from a lane boundary. However, when the vehicle 50 is traveling below the prescribed speed, the automatic signaling system automatically activates the signaling system 18 when the vehicle 50 is, for example, less than 6 inches, from a lane boundary. Such technique may be desirable because it allows the vehicle 50 that is traveling at a relatively slower speed to detract relatively more from the center line 61 of the lane 60 before activating the signaling system 18.

Automatic Signaling System with Light Sensing Capability

Figure 6B:
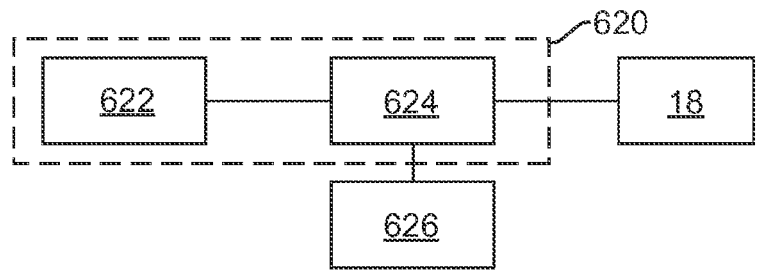
FIG. 6B illustrates a schematic block diagram of an automatic signaling system that has light sensing capability in accordance with other embodiments.

In some cases, a sensor of an automatic signaling system may capture better images when the vehicle 50 is in a bright environment. As such, it may be desirable to allow automatic control of the turn signaling system 18 when an environment in which the vehicle 50 is being operated is bright enough. FIG. 6B illustrates a schematic block diagram of an automatic signaling system 620 in accordance with other embodiments. The automatic signaling system 620 includes a sensor 622, and a processor 624 coupled to the sensor 622. The sensor 622 is configured for sensing a condition of an environment in which the vehicle 50 is traveling, and the processor 624 is configured to automatically activate and/or deactivate the turn signaling system 18 of the vehicle 50 based at least in part on the sensed condition by the sensor 622. The sensor 622 and the processor 624 can be any of the sensors and the processors, respectively, described herein, and the operations and functionalities of the sensor 622 and the processor 624 are similar to those described previously. However, unlike the previously described embodiments, the processor 624 of the automatic signaling system 620 is further configured to be coupled to a light sensor 626 for sensing a light impinged on the vehicle 50. The light sensor 626 is preferably secured to a roof of the vehicle 50, but can be secured to other locations in other embodiments. The automatic signaling system 620 may or may not include the light sensor 626.

During use, the processor 624 receives data or signal from the light sensor 626 regarding a brightness of an environment in which the vehicle 50 is being operated, and uses the light data or signal as a criteria for allowing automatic control of the turn signaling system 18 of the vehicle 50. In such cases, the processor 624 does not allow automatic activation of the turn signaling system 18 if the light data indicates that a brightness of the environment is below a prescribed level. However, when the brightness of the environment is above the prescribed level, the processor 624 then controls an activation and/or deactivation of the signaling system 18, as similarly discussed previously.

In other embodiments, the automatic signaling system 620 includes a switch (not shown) that is coupled to the light sensor 626. In such cases, the switch activates and deactivates the sensor 622 and/or the processor 624, or block signals from the processor 624 to the turn signaling system 18, when data or signal from the light sensor 626 indicates that a brightness of an environment is below a prescribed level. On the other hand, when data or signal from the light sensor 626 indicates that a brightness of an environment is above the prescribed level, the switch activates the sensor 622 and/or the processor 624, or allows signals be transmitted from the processor 624 to the turn signaling system 18, thereby allowing the processor 624 to control the turn signaling system 18. The switch can be a separate component from the processor 624, or alternatively, be a part of the processor 624.

In alternative embodiments, instead of the light sensor 626, the automatic signaling system 620 can include other types of sensor, such as a solar energy sensor, for determining a variable associated with a brightness of an environment. Furthermore, instead of the light sensor 626, in other embodiments, the automatic signaling system 620 is coupled to a clock of the vehicle 50. In such cases, a time can be used to determine whether to allow automatic control of the turn signaling system 18 of the vehicle 50, and the automatic signaling system 620 controls the turn signaling system 18 at a certain prescribed time of a day.

Automatic Signaling System with Moisture Sensing Capability

Figure 6C:
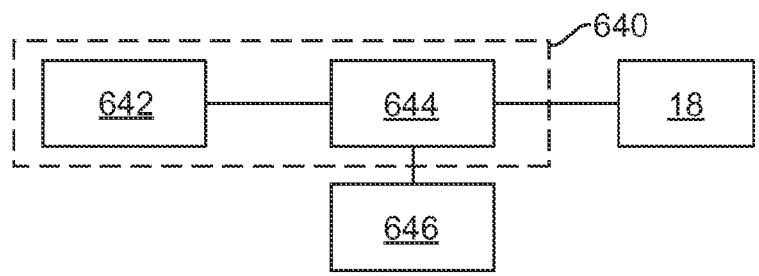
FIG. 6C illustrates a schematic block diagram of an automatic signaling system that has moisture sensing capability in accordance with other embodiments.

In some cases, a sensor of an automatic signaling system may capture better images when the vehicle 50 is being operated in a non-rainy day. As such, it may be desirable to allow automatic control of the turn signaling system 18 when there is no rain. FIG. 6C illustrates a schematic block diagram of an automatic signaling system 640 in accordance with other embodiments. The automatic signaling system 640 includes a sensor 642, and a processor 644 coupled to the sensor 642. The sensor 642 is configured for sensing a condition of an environment in which the vehicle 50 is traveling, and the processor 644 is configured to automatically activate and/or deactivate the turn signaling system 18 of the vehicle 50 based at least in part on the sensed condition by the sensor 642. The sensor 642 and the processor 644 can be any of the sensors and processors, respectively, described herein, and the operations and functionalities of the sensor 642 and the processor 644 are similar to those described previously. However, unlike the previously described embodiments, the processor 644 of the automatic signaling system 640 is further configured to be coupled to a moisture sensor 646 for sensing a moisture of an environment outside the vehicle 50. The moisture sensor 646 can be any sensor known in the art of moisture sensing. The automatic signaling system 640 may or may not include the moisture sensor 646.

During use, the processor 644 receives data or signal from the moisture sensor 646 regarding a moisture of an environment in which the vehicle 50 is being operated, and uses the moisture data or signal as a criteria for allowing automatic control of the turn signaling system 18 of the vehicle 50. In such cases, the processor 644 does not allow automatic activation of the turn signaling system 18 if the moisture data indicates that a moisture of the environment is above a prescribed level. However, when the moisture of the environment is below the prescribed level, the processor 644 then controls an activation and/or deactivation of the turn signaling system 18, as similarly discussed previously.

In other embodiments, the automatic signaling system 640 includes a switch (not shown) that is coupled to the moisture sensor 646. In such cases, the switch activates and deactivates the sensor 642 and/or the processor 644, or block signals from the processor 644 to the turn signaling system 18, when data or signal from the moisture sensor 646 indicates that a moisture of an environment is above a prescribed level. On the other hand, when data or signal from the moisture sensor 646 indicates that a moisture of an environment is below a prescribed level, the switch activates the sensor 642 and/or the processor 644, or allows signals be transmitted from the processor 644 to the turn signaling system 18, thereby allowing the processor 644 to control the turn signaling system 18. The switch can be a separate component from the processor 644, or alternatively, be a part of the processor 644.

In alternative embodiments, instead of the moisture sensor 646, the automatic signaling system 640 is coupled to a windshield wiper system of the vehicle 50. In such cases, the automatic signaling system 620 controls the turn signaling system 18 only when the windshield wiper system is deactivated, and does not control the turn signaling system 18 when the windshield wiper system is activated.

Automatic Signaling System with Learning Capability

Figure 7:
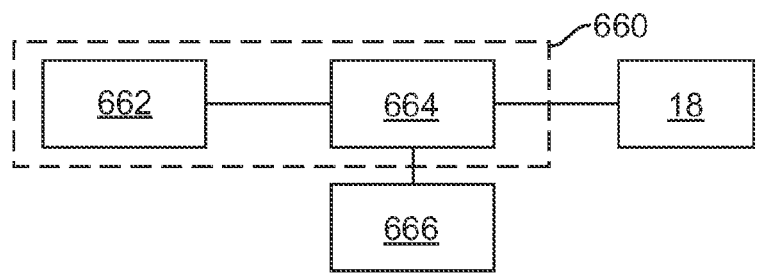
FIG. 7 illustrates a schematic block diagram of an automatic signaling system that has learning capability in accordance with other embodiments.

Since different drivers may have different driving styles (e.g., some drivers tend to sway left and right away from a center line of a lane more than others), it may be desirable to provide an automatic signaling system with learning capability such that it can adapt to different drivers' driving styles. FIG. 7 illustrates a schematic block diagram of an automatic signaling system 660 in accordance with other embodiments. The automatic signaling system 660 includes a sensor 662, and a processor 664 coupled to the sensor 662. The sensor 662 is configured for sensing a condition of an environment in which the vehicle 50 is traveling, and the processor 664 is configured to automatically activate and/or deactivate the turn signaling system 18 of the vehicle 50 based at least in part on the sensed condition by the sensor 662. The sensor 662 and the processor 664 can be any of the sensors and processors, respectively, described herein, and the operations and functionalities of the sensor 662 and the processor 664 are similar to those described previously. In the illustrated embodiments, the automatic signaling system 660 further includes a memory 666 for storing data regarding operation data of the vehicle 50. The memory 666 is illustrated as a separate component from the processor 664, but alternatively, can be integrated with, or be a part of, the processor 664.

FIG. 8 illustrates a traveled path 800 of the vehicle 50 that is traveling within the lane 60. During use, the processor 664 determines a distance 802 between the vehicle 50 and the center line 61 of the lane 60 as the vehicle 50 is traveling within the lane 60. The distance 802 (which is shown as the distance between a peak of the traveled path 800 and the center line 61 is that associated with the case in which the vehicle 50 has traveled away from the center line 61, but subsequently moved back without changing lane. The distance 802 are stored in the memory 666, and can be used by the processor 664 to adjust a criteria for controlling the turn signaling system 18. If the stored distance data indicates that a driver tends to sway relatively more (i.e., compared to a prescribed threshold), the processor 664 then decreases a sensitivity of the automatic signaling system 660. For example, the processor 664 can adjust a threshold value (e.g., the thresholds 510, 512) such that the vehicle 50 can sway relatively more within the lane 60 before the processor 664 activates the turn signaling system 18. If the stored distance data indicates that a driver tends to sway relatively less (i.e., compared to a prescribed threshold), the processor 664 then increases a sensitivity of the automatic signaling system 660. For example, the processor 664 can adjust a threshold value (e.g., the thresholds 510, 512) such that the a relatively less swaying distance between the vehicle 50 and the center line 61 will result in the processor 664 activating the turn signaling system 18. Although one example of operation data has been described, in alternative embodiments, the operation data can include other data, such as a distance between the vehicle 50 and a lane boundary, a steering angle, directional vector of the vehicle 50, velocity vector of the vehicle 50, acceleration vector of the vehicle 50, or combination thereof.

In some embodiments, the processor 664 performs statistical analysis using the stored distance 802 to determine how much to adjust a criteria for activating the turn signaling system 18. For example, the processor 664 can determine a distribution curve or a histogram representing a frequency of occurrence for each prescribed range of distance 802, and determines how much to adjust a criteria for activating the turn signaling system 18 based on an analysis of the distribution curve or the histogram. Other methods of analyzing the stored distance data can also be used. In some embodiments, the processor 664 uses all the previously recorded operation data in the current analysis. In other embodiments, the processor 664 uses only the most recent operation data, such as, operation data that are obtained within the last five minutes, or the last ten sets of operation data, in the current analysis.

In some embodiments, the automatic signaling system 660 deletes previously recorded operation data of the vehicle 50 and records new operation data of the vehicle 50 when the vehicle 50 is started. In other embodiments, the automatic signaling system 660 does not delete previously recorded operation data, but continues to record additional operation data in different driving sessions. In such cases, the automatic signaling system 660 creates different files (which may be store in memory 666, for example) for different users, with each file containing operation data and/or lane change criteria for a specific user, and provides a user interface (e.g., one or a plurality of buttons) for allowing a user to select his/her file when operating the vehicle 50. In some embodiments, the automatic signaling system 660 associates an identification stored in a key-memory with one of the stored files, such that when a user's key is inserted into an ignition system of the vehicle 50, the automatic signaling system 660 automatically selects the file that is associated with the identification stored in the key-memory.

Activating Turn Signaling System Based on Other Sensed Conditions

Although several examples of an automatic signaling system have been described with reference to automatically activating the turn signaling system 18 of the vehicle 50 in response to a driver making a lane change maneuver, the scope of the invention should not be so limited. In alternative embodiments, any of the automatic signaling systems described herein can also be configured to control the turn signaling system 18 of the vehicle 50 in response to other sensed conditions. For example, in other embodiments, an automatic signaling system can be configured to identify an intersection, a road sign, a traffic light, a painted sign in a lane, a pedestrian curb, a pedestrian, a vehicle, or other objects in an environment in which the vehicle 50 is being operated. For example, processors configured for performing image identification, such as those available from Mobileye N.V., Netherlands, may be used. Based on the detected object(s) in the environment, the processor 14 then determines whether the vehicle 50 is making a lane change maneuver or is about to make a turn (e.g., at an intersection), and accordingly, activates the appropriate turn signal lights 52, 54, 56, 58 of the vehicle 50. For example, the processor 14 can be configured to determine whether the vehicle 50 is making a lane change based at least in part on the position of an identified object in the image. In other embodiments, the processor 14 can be configured to determine whether the vehicle 50 is making a lane change based at least in part on a plurality of positions of an identified object in multiple image frames. For example, the positions of an identified object in multiple image frames can be used to calculate a direction of relative movement between the vehicle 50 and the lane 60.

Switch for Automatic Signaling System

In any of the embodiments of the automatic signaling system described herein, the automatic signaling system can further include a switch (or a user control), which allows a user to activate and/or de-activate the automatic signaling system. FIG. 9A illustrates a turn signal control 900 having a switch 902 for activating and deactivating an automatic signaling system (e.g., the automatic signaling system 10, 300, 400, 600, 620, 640, or 660) in accordance with some embodiments. The turn signal control 900 has a first end 904, a second end 906, and a body 908 extending between the first and the second ends 904, 906. The second end 906 of the turn signal control 900 is rotatably coupled to a steering wheel support 910. In the illustrated embodiments, the switch 902 is located at the first end 904 of the turn signal control 900. The turn signal control 900 can be positioned upward (as represented by arrow 912) or downward (as represented by arrow 914) to activate the exterior turn signal lights 52, 54, 56, 58 in a conventional manner. A user can press the switch 902 once to activate an automatic signaling system, thereby allowing the automatic signaling system to automatically activates turn signal lights of a vehicle. The switch 902 can be pressed again to deactivate the automatic signaling system.

In the illustrated embodiments, the turn signal control 900 further includes a sensitivity switch 920 for adjusting a sensitivity of the automatic signaling system. The sensitivity switch 920 is located at the first end 914, and can be rotated about an axis 922 of the turn signal control 900. Rotation of the switch 920 in a first direction increases a sensitivity of the automatic signaling system, thereby allowing the vehicle 50 to sway less relative to the center line 61 of the lane 60 before the automatic signaling system activates the turn signaling system 18. Rotation of the switch 920 in a second direction (i.e., opposite from the first direction) decreases a sensitivity of the automatic signaling system, thereby allowing the vehicle 50 to sway more relative to the center line 61 of the lane 60 before the automatic signaling system activates the turn signaling system 18. For example, for the automatic signaling system 400 described with reference to FIGS. 4 and 5, rotation of the switch 920 in the first direction reduces a distance 514 between the thresholds 510, 512 in an image frame, and rotation of the switch 920 in the second direction increases the distance 514 between the thresholds 510, 512. In other embodiments, the turn signal control 900 does not include the sensitivity switch 920.

In some embodiments, data regarding the adjusted sensitivity can be stored in a memory, such as a key-memory of a key. In such cases, when the key is used to start the vehicle 50, the processor (e.g., the processor 14, 306, 406, 604, 624, 644, or 664) of the automatic signaling system receives the data from the key-memory, and operates the turn signaling system 18 using the sensitivity associated with the received data. In other embodiments, the key only has an identification and does not store data regarding a sensitivity of the automatic signaling system. In such cases, the automatic signaling system includes an identification reader, which reads an identification in the key when the key is used to start the vehicle 50. The processor then associates the identification of the key with a sensitivity of the automatic signaling system, and uses the sensitivity associated with the identification of the key to operate the turn signaling system 18. Other methods and devices can also be used to provide different sensitivity of the automatic signaling system for different users.

FIG. 9B illustrates a turn signal control 950 that can be used to activate and deactivate an automatic signaling system in accordance with other embodiments. The turn signal control 950 has a first end 954, a second end 956, and a body 958 extending between the first and the second ends 954, 956. The second end 956 of the turn signal control 950 is rotatably coupled to a steering wheel support 960. The turn signal control 950 can be positioned upward (as represented by arrow 962) or downward (as represented by arrow 964) to the activate exterior turn signal lights 52, 54, 56, 58 of the vehicle 50 in a conventional manner. The turn signal control 950 can also be positioned forward (as represented by arrow 966) or backward (as represented by arrow 968).

In the illustrated embodiments, pushing the turn signal control 950 forward activates the automatic signaling system, and pulling the turn signal control 950 backward deactivates the automatic signaling system. In other embodiments, the automatic signaling system is activated by pulling the turn signal control 950 backward once, and is deactivated by pulling the turn signal control 950 backward again after it has been activated. In such cases, the forward movement of the turn signal control 950 can be reserved to perform another function, such as to activate and deactivate headlights of a vehicle. Also in other embodiments, the automatic signaling system is activated by pushing the turn signal control 950 forward once, and is deactivated by pushing the turn signal control 950 forward again after it has been activated. In such cases, the backward movement of the turn signal control 950 can be reserved to perform another function, such as to activate and deactivate headlights of a vehicle.

The turn signal control 950 also includes a sensitivity switch 970 for adjusting a sensitivity of the automatic signaling system, as similarly discussed previously. However, in other embodiments, the turn signal control 950 does not include the sensitivity switch 970.

Although several examples of switches for activating an automatic signaling system have been described, the scope of the invention should not be so limited. In alternative embodiments, instead of implementing a switch at a turn signal control, or instead of using the turn signal control, to activate an automatic signaling system, an automatic signaling system can include an activation switch and/or a sensitivity switch located at other positions within a compartment of the vehicle 20. For example, either or both of an activation switch and a sensitivity switch can be located on a dashboard, a steering wheel, a door panel, a transmission control, or a roof, of the vehicle 50.

Computer Architecture

Figure 10:
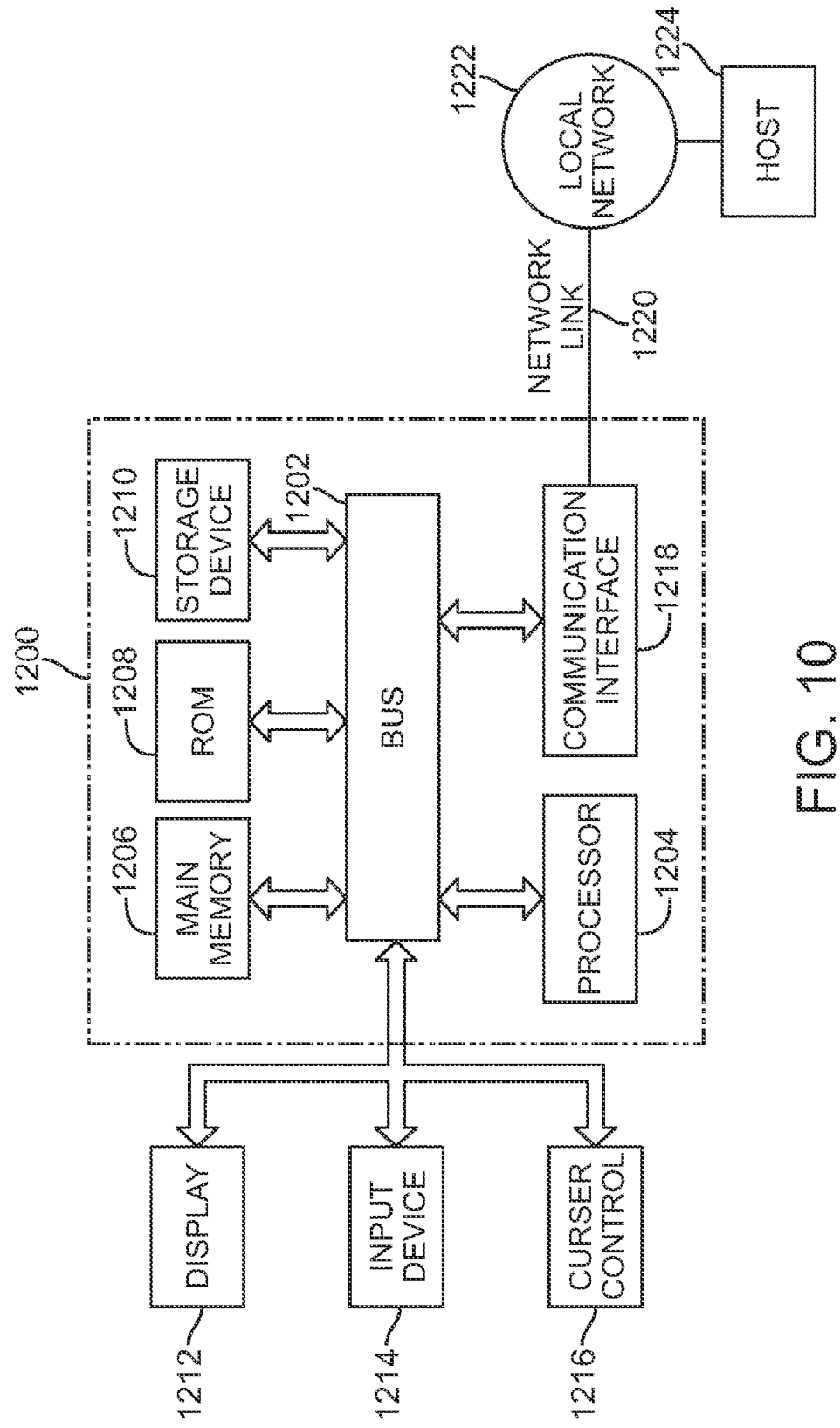
FIG. 10 illustrates a block diagram of an embodiment of a computer system upon which embodiments may be implemented.

FIG. 10 is a block diagram that illustrates an embodiment of a computer system 1200, which can be configured to perform various functions described herein. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 may further include a read only memory (ROM) 1208 or other static storage device coupled to bus 1202 for storing static information and instructions for processor 1204. A data storage device 1210, such as a magnetic disk or optical disk, is provided and coupled to bus 1202 for storing information and instructions.

Computer system 1200 may be coupled via bus 1202 to a display 1212, such as a cathode ray tube (CRT) or a flat panel display, for displaying information to a user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

According to some embodiments, computer system 1200 can be used to activate the turn signaling system 18 of the vehicle 50 in response to processor 1204 executing one or more sequences of one or more instructions contained in the main memory 1206. Such instructions may be read into main memory 1206 from another computer-readable medium, such as storage device 1210. Execution of the sequences of instructions contained in main memory 1206 causes processor 1204 to perform the process steps described herein. One or more processors in a multi-processing arrangement may also be employed to execute the sequences of instructions contained in main memory 1206. In alternative embodiments, hard-wired circuitry may be used in place of or in combination with software instructions to implement the embodiments described herein. Thus, embodiments are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector coupled to bus 1202 can receive the data carried in the infrared signal and place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry data streams representing various types of information. In some embodiments, the computer system 1200 (or any of the processors described herein) receives programmed instructions from a wireless network. In such cases, the programmed instructions represent an algorithm and/or prescribed criteria, which the computer system 1200 (or the processor) can use to control the turn signaling system 18 of the vehicle 50.

Network link 1220 typically provides data communication through one or more networks to other devices. For example, network link 1220 may provide a connection through local network 1222 to a host computer 1224. The data streams transported over the network link 1220 can comprise electrical, electromagnetic or optical signals. The signals through the various networks and the signals on network link 1220 and through communication interface 1218, which carry data to and from computer system 1200, are exemplary forms of carrier waves transporting the information. Computer system 1200 can send messages and receive data, including program code, through the network(s), network link 1220, and communication interface 1218. Although one network link 1220 is shown, in alternative embodiments, communication interface 1218 can provide coupling to a plurality of network links, each of which connected to one or more local networks. In some embodiments, computer system 1200 may receive data from one network, and transmit the data to another network.

Computer system 1200 may process and/or modify the data before transmitting it to another network.

Although particular embodiments have been shown and described, it will be understood that they are not intended to limit the present inventions, and it will be obvious to those skilled in the art that various changes and modifications may be made. For example, the operations performed by any of the processors 14, 306, 406, 604, 624, 644, 664 can be performed by any combination of hardware and software within the scope of the invention, and should not be limited to particular embodiments comprising a particular definition of "processor". In addition, different features described with reference to different embodiments can be combined. For example, in some embodiments, an automatic signaling system can include both the speed sensor 606 and the light sensor 626. Further, instead of the vehicle 50 being a car, in other embodiments, the vehicle 50 can be a motorcycle, a bicycle, an ATV, or other types of transportation vehicle. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A system, comprising:
  an automatic signaling system configured to be coupled to a turn signal light of a vehicle, the automatic signaling system configured to automatically activate the turn signal light of the vehicle before or when a portion of the vehicle reaches a boundary of a lane;
  a lever for activating a turn signal light of a vehicle, the lever having a first end, a second end, and a body extending between the first and the second ends; and
  a first switch located on the lever, the first switch operable to activate, deactivate, or activate and deactivate, the automatic signaling system.

2. The control of claim 1, further comprising a second switch for adjusting a sensitivity of the automatic signal system.

3. A control, comprising:
  an automatic signaling system configured to be coupled to a turn signal light of a vehicle, the automatic signaling system configured to automatically activate the turn signal light of the vehicle before or when a portion of the vehicle reaches a boundary of a lane;
  a lever for activating the turn signal light of a vehicle, the lever having a first end, a second end, and a body extending between the first and the second ends, the first end being movable in a first direction to activate the automatic signaling system.

4. The control of claim 3, wherein the first end is movable in a second direction to de-activate the automatic signaling system.

5. The control of claim 4, wherein the first end is movable in a third direction to activate the turn signal light.

6. An automatic signaling system, comprising:
  a processor having an input for receiving signals from a sensor, and an output to be coupled to a signaling system of a vehicle, the signaling system having a turn signal light;
  wherein the processor is configured to determine a value associated with a spatial relationship between a vehicle and a lane boundary using the signals, and automatically activate the turn signal light based at least in part on the determined value;
  wherein the processor is configured to compare a threshold value with the value that is associated with the spatial relationship, and wherein the threshold value is variable based on a speed of the vehicle.

7. The automatic signaling system of claim 6, wherein the processor operates independent of an angle of a turning wheel of the vehicle.

8. The system of claim 6, further comprising the sensor.

9. The system of claim 8, wherein the sensor comprises an image sensor configured for sensing at least a portion of a lane.

10. The system of claim 8, wherein the sensor comprises a signal receiver configured to wirelessly receive information regarding a position of the vehicle.

11. The system of claim 6, wherein the processor is coupled to a device selected from the group consisting of a speed sensor, a light sensor, and a moisture sensor.

12. The system of claim 6, wherein the processor is configured to activate the turn signal light based at least in part on the determined value, and when the vehicle is traveling above a prescribed speed.

13. The system of claim 6, further comprising a reader for reading data from a key-memory, wherein the processor is configured to activate the turn signal light based on the determined value and the data.

14. The system of claim 6, wherein the spatial relationship between the vehicle and the lane boundary comprises a position of the vehicle relative to the lane boundary.

15. The system of claim 6, wherein the spatial relationship between the vehicle and the lane boundary comprises an orientation of the vehicle relative to the lane boundary.

16. The system of claim 6, wherein the signals comprise image data of an image frame, and wherein the processor is configured to determine the value by:
  performing image processing on the image data to identify the lane boundary;
  determining a position of the identified lane boundary in the image frame; and
  determining the spatial relationship based on the determined position of the identified lane boundary.

17. The system of claim 16, wherein the position is relative to the image frame.

18. The system of claim 16, wherein the processor is further configured to use information regarding a previously identified lane boundary to identify the lane boundary.

19. The system of claim 6, wherein the value that is associated with the spatial relationship comprises a distance between the vehicle and the lane boundary.

20. The system of claim 6, wherein the threshold value is also variable based on a width of a lane.

21. The system of claim 6, wherein the processor is also configured to automatically deactivate the turn signal light.

22. The system of claim 21, wherein the processor is configured to automatically deactivate the turn signal light after the turn signal light has been activated for a prescribed duration.

23. An automatic signaling system, comprising:
  a processor having an input for receiving image data, and an output to be coupled to a signaling system of a vehicle, the signaling system having a turn signal light;
  wherein the processor is configured to process the image data to identify a lane boundary, and automatically activate the turn signal light based at least in part on the identified lane boundary; and
  wherein the processor is configured to identify the lane boundary using a region of interest.

24. The system of claim 23, wherein the processor is configured to automatically activate the turn signal light based at least in part on the identified lane boundary by:

determining a distance between the vehicle and the identified lane boundary;
comparing the distance with a threshold value; and
automatically activate the turn signal light based at least in part on a result of the comparison.

25. The system of claim 24, wherein the threshold value is variable based on one or more parameters selected from the group consisting of a width of a lane, a width of the vehicle, and a speed of the vehicle.

26. The system of claim 25, wherein the position of the identified lane boundary is relative to an image frame.

27. The system of claim 23, wherein the processor is configured to automatically activate the turn signal light based at least in part on the identified lane boundary by:
determining a position of the identified lane boundary; and
automatically activate the turn signal light based at least in part on the determined position.

28. The system of claim 23, wherein the processor is configured to automatically activate the turn signal light based at least in part on the identified lane boundary by:
determining an orientation of the identified lane boundary; and
automatically activate the turn signal light based at least in part on the determined orientation.

29. The system of claim 23, wherein the processor is configured to identify the lane boundary using a previously identified lane boundary.

30. The system of claim 23, further comprising a sensor for generating the image data, wherein the sensor is configured to be mounted at a location that is behind a rear-view mirror.

31. The system of claim 23, wherein the processor is also configured to automatically deactivate the turn signal light.

32. The system of claim 31, wherein the processor is configured to automatically deactivate the turn signal light after the turn signal light has been activated for a prescribed duration.

33. An automatic signaling system, comprising:
a processor having an input for receiving information, and an output to be coupled to a signaling system of a vehicle, the signaling system having a turn signal light;
wherein the processor is configured to process the information, and automatically activate the turn signal light based on the processed information before or when a portion of the vehicle reaches a boundary of a lane in which the vehicle is traveling.

34. The system of claim 33, wherein the processor is configured to process the information to identify the boundary of the lane.

35. The system of claim 34, wherein the processor is further configured to determine a position of the boundary of the lane.

36. The system of claim 35, wherein the position of the boundary is relative to an image frame.

37. The system of claim 34, wherein the processor is further configured to determine an orientation of the boundary.

38. The system of claim 34, wherein the processor is configured to identify the boundary of the lane using a previously identified lane boundary.

39. The system of claim 34, wherein the processor is configured to identify the boundary of the lane using a region of interest.

40. The system of claim 33, further comprising a device coupled to the processor, the device selected from the group consisting of a speed sensor, a rain sensor, and a moisture sensor.

41. The system of claim 33, wherein the processor is further configured to automatically de-activate the turn signal light after a completion of a lane-change maneuver by the vehicle.

42. The system of claim 33, wherein the processor is further configured to automatically de-activate the turn signal light after the turn signal light has been activated for a prescribed duration.

43. The system of claim 33, further comprising a sensor for generating the information, wherein the sensor is configured to be mounted at a location that is behind a rear-view mirror.

44. The system of claim 33, wherein the processor is configured to process the information to determine a position of the vehicle relative to the boundary of the lane.

45. The system of claim 33, wherein the processor is configured to process the information to determine an orientation of the vehicle relative to the boundary of the lane.

46. The system of claim 33, wherein the processor is configured to process the information to
determine a distance between the vehicle and the boundary, and
compare the distance with a threshold value.

47. The system of claim 46, wherein the threshold value is variable based on a speed of the vehicle.

48. The system of claim 46, wherein the threshold value is variable based on a width of the lane.

* * * * *